United States Patent
Parian et al.

(10) Patent No.: US 12,112,508 B2
(45) Date of Patent: *Oct. 8, 2024

(54) CALIBRATING SYSTEM FOR COLORIZING POINT-CLOUDS

(71) Applicant: FARO Technologies, Inc., Lake Mary, FL (US)

(72) Inventors: Jafar Amiri Parian, Schlieren (DE); Martin Ossig, Tamm (DE); Hani Kaabi, Korntal-Münchingen (DE)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,934

(22) Filed: Aug. 15, 2023

(65) Prior Publication Data

US 2023/0386085 A1    Nov. 30, 2023

Related U.S. Application Data

(63) Continuation of application No. 17/678,116, filed on Feb. 23, 2022, now Pat. No. 11,790,557.

(Continued)

(51) Int. Cl.
*G06T 7/90* (2017.01)
*G01S 7/497* (2006.01)
(Continued)

(52) U.S. Cl.
CPC ............... *G06T 7/90* (2017.01); *G01S 7/497* (2013.01); *G01S 17/86* (2020.01); *G01S 17/89* (2013.01);
(Continued)

(58) Field of Classification Search
CPC .......... G06T 7/90; G06T 3/4038; G06T 7/80; G06T 19/20; G06T 2207/10024;
(Continued)

(56) References Cited

U.S. PATENT DOCUMENTS 8,705,012 B2    4/2014    Greiner et al.
9,693,040 B2    6/2017    Hillebrand et al.
(Continued)

OTHER PUBLICATIONS

Biber et al., 3D Modeling of Indoor Environments by a Mobile Platform with a Laser Scanner and Panoramic Camera. 2005 13th European Signal Processing Conference. 4 pages, Sep. 2005.

(Continued)

*Primary Examiner* — Farzana Hossain
(74) *Attorney, Agent, or Firm* — McCarter & English, LLP; Dave S. Christensen

(57) ABSTRACT

A system includes a three-dimensional (3D) scanner that captures a 3D point cloud corresponding to one or more objects in a surrounding environment. The system further includes a camera that captures a control image by capturing a plurality of images of the surrounding environment, and an auxiliary camera configured to capture an ultrawide-angle image of the surrounding environment. One or more processors of the system colorize the 3D point cloud using the ultrawide-angle image by mapping the ultrawide-angle image to the 3D point cloud. The system performs a limited system calibration before colorizing each 3D point cloud, and a periodic full system calibration before/after a plurality of 3D point clouds are colorized.

20 Claims, 17 Drawing Sheets

Related U.S. Application Data

(60) Provisional application No. 63/180,285, filed on Apr. 27, 2021.

(51) Int. Cl.
| | |
|---|---|
| *G01S 17/86* | (2020.01) |
| *G01S 17/89* | (2020.01) |
| *G06T 3/4038* | (2024.01) |
| *G06T 7/80* | (2017.01) |
| *G06T 19/20* | (2011.01) |
| *G06V 10/75* | (2022.01) |
| *H04N 17/00* | (2006.01) |
| *H04N 23/698* | (2023.01) |

(52) U.S. Cl.
CPC .............. *G06T 3/4038* (2013.01); *G06T 7/80* (2017.01); *G06T 19/20* (2013.01); *G06V 10/757* (2022.01); *H04N 17/002* (2013.01); *H04N 23/698* (2023.01); *G06T 2207/10024* (2013.01); *G06T 2207/10028* (2013.01); *G06T 2219/2012* (2013.01)

(58) Field of Classification Search
CPC ... G06T 2207/10028; G06T 2219/2012; G06T 2207/10016; G06T 2207/20164; G01S 7/497; G01S 17/86; G01S 17/89; G06V 10/757; H04N 17/002; H04N 23/698

See application file for complete search history.

(56) References Cited

U.S. PATENT DOCUMENTS

| | | | |
|---|---|---|---|
| 9,762,883 | B2 | 9/2017 | Vollrath et al. |
| 10,841,562 | B2 | 11/2020 | Heidemann et al. |
| 11,790,557 | B2* | 10/2023 | Parian .................. H04N 17/002 |
| | | | 348/36 |
| 2015/0341552 | A1 | 11/2015 | Chen et al. |
| 2017/0161867 | A1 | 6/2017 | Becker et al. |
| 2018/0262737 | A1* | 9/2018 | Monnier ................ H04N 13/15 |
| 2021/0003684 | A1 | 1/2021 | Gong et al. |
| 2022/0128671 | A1 | 4/2022 | Parian et al. |
| 2022/0179038 | A1* | 6/2022 | Huffman ................... G01S 5/16 |
| 2023/0351677 | A1* | 11/2023 | Li ......................... G06T 15/205 |

OTHER PUBLICATIONS

Parian et al., Sensor Modeling, Self-calibration and Accuracy Testing of Panoramic Cameras and Laster Scanners. ISPRS Journal of Photogrammetry and Remote Sensing. 2010;65:60-76.

European Office Action for Application No. 22169336.9, dated Oct. 12, 2022, 9 pages.

* cited by examiner

810

| Function | Domain | Range |
|---|---|---|
| $\sin^{-1}(x)$ | $[-1, 1]$ | $\left[-\frac{\pi}{2}, \frac{\pi}{2}\right]$ |
| $\cos^{-1}(x)$ | $[-1, 1]$ | $[0, \pi]$ |
| $\tan^{-1}(x)$ | $(-\infty, \infty)$ | $\left(-\frac{\pi}{2}, \frac{\pi}{2}\right)$ |
| $\cot^{-1}(x)$ | $(-\infty, \infty)$ | $(0, \pi)$ |
| $\sec^{-1}(x)$ | $(-\infty, -1] \cup [1, \infty)$ | $\left[0, \frac{\pi}{2}\right) \cup \left(\frac{\pi}{2}, \pi\right]$ |
| $\csc^{-1}(x)$ | $(-\infty, -1] \cup [1, \infty)$ | $\left[-\frac{\pi}{2}, 0\right) \cup \left(0, \frac{\pi}{2}\right]$ |

FIG. 9

Coloring by using the FSC parameters (3 weeks old). Alignment errors are seen because of change of parameters (aging effect).

Coloring by using LSC. All parameters were re-estimated (by using only laser intensity image) and therefore, the coloring result has no alignment error.

CALIBRATING SYSTEM FOR COLORIZING POINT-CLOUDS

CROSS REFERENCE TO RELATED APPLICATIONS

This application is a continuation of U.S. patent application Ser. No. 17/678,116, filed Feb. 23, 2022, which claims the benefit of U.S. Provisional Application Ser. No. 63/180,285, filed Apr. 27, 2021, the entire disclosure of which is incorporated herein by reference.

BACKGROUND

The subject matter disclosed herein relates to use of a three-dimensional (3D) measurement devices to capture 3D point clouds (point clouds), and particularly to 3D measurement devices that include a 3D scanner to capture the point clouds and a 2D camera to capture color data for the point clouds. More specifically, technical solutions are described herein to improve colorization of the point clouds by improving calibration between the 2D camera and the 3D scanner.

Typically, the 3D scanner is a time-of-flight (TOF) laser scanner, which steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating the 3D image requires at least three values for each data point. These three values may include the distance and two angles, or may be transformed values, such as the x, y, z coordinates. In an embodiment, the 3D image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer).

Many contemporary laser scanners include a 2D camera, such as a color camera, mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner 3D image. To generate a color scanner image, at least three positional coordinates (such as x, y, z) and three color values (such as red, green, blue "RGB") are collected for each data point.

Some 3D scanners use high dynamic range (HDR) techniques with the color camera to provide enhanced color images that used with the scanner image to provide a more accurate color representation of the scanned environment. HDR techniques involve acquiring multiple images at each location with different exposure settings. These images are then combined to provide a resulting image that more accurately represents the environment. Another option for HDR, sometimes named interference mode, is to apply different exposure times to different parts of one captured image. This technique is useful in areas having high contrast (light and dark areas). While HDR images are certainly useful in enhancing the color of the scanner image, the acquiring of multiple images at different exposures can be time consuming. For example, to acquire images in a 360 spherical area about the 3D scanner may take more than 60 images. If each of these 60 images has multiple exposures, then the time to acquire all of the images may be lengthy.

Accordingly, while existing 3D scanners are suitable for their intended purposes, what is needed is a 3D scanner having certain features of embodiments of the present disclosure.

BRIEF DESCRIPTION

A system includes a three-dimensional (3D) scanner that captures a 3D point cloud corresponding to one or more objects in a surrounding environment. The system further includes a camera that captures a control image by capturing a plurality of images of the surrounding environment, and an auxiliary camera configured to capture an ultrawide-angle image of the surrounding environment. One or more processors of the system colorize the 3D point cloud using the ultrawide-angle image by mapping the ultrawide-angle image to the 3D point cloud. The system performs a limited system calibration before colorizing each 3D point cloud, and a periodic full system calibration before/after a plurality of 3D point clouds are colorized.

The full system calibration calibrates the 3D scanner, the camera, and the auxiliary camera using the 3D point cloud, the control image, and a calibration image, which is another ultrawide-angle image from the auxiliary image.

The full system calibration includes extracting a first plurality of features from the control image using a feature-extraction algorithm. The full system calibration further includes extracting a second plurality of features from the calibration image using the feature-extraction algorithm. The full system calibration further includes determining a set of matching features from the first plurality of features and the second plurality of features by using a feature-matching algorithm. The full system calibration further includes building control points by using the set of matching features and the laser scan 3D point cloud. The full system calibration further includes determining all system calibration parameters on-the-fly through using bundle adjustment and camera self-calibration.

The limited system calibration is performed before colorizing the 3D point cloud.

The limited system calibration updates a subset from the set of system calibration parameters.

The limited system calibration includes extracting a third plurality of features from the control image using the feature-extraction algorithm. The limited system calibration further includes determining another set of matching features to the extracted features at the first plurality of features by using a hybrid feature matching algorithm. The limited system calibration further includes building control points by using the another set of matching features and the 3D point cloud. The limited system calibration further includes determining fully or partially updated values for at least one of the system calibration parameters on-the-fly through bundle adjustment and camera self-calibration.

Two successive full system calibrations are performed after a predetermined interval.

In some embodiments, successive full system calibrations are performed after a predetermined number of 3D point clouds are colorized.

In some embodiments, extracting the second plurality of features from the calibration image includes transforming the calibration image to a spherical image, and extracting the second plurality of features from the spherical image.

In some embodiments, the auxiliary camera includes two lenses at predetermined offsets relative to each other.

In some embodiments, determining the points in the 3D point cloud that are corresponding to the set of matching features is performed using bilinear interpolation.

In some embodiments, the set of system calibration parameters includes a first plurality of camera calibration parameters, a second plurality of dual-camera calibration parameters, and a third plurality of multi-device orientation parameters.

In some embodiments, the camera is an integral part of the 3D scanner.

In some embodiments, the auxiliary camera is mounted on the 3D scanner at a predetermined position relative to the 3D scanner.

According to some aspects described herein, a method includes periodically performing a full system calibration of a measurement device that comprises a 3D scanner, a camera, and an auxiliary camera. The method further includes performing a limited system calibration of the measurement device in response to capturing a second 3D point cloud that is to be colorized, wherein the limited system calibration comprises updating a subset from the set of system calibration parameters using the second 3D point cloud and a second ultrawide-angle image from the auxiliary camera.

According to some aspects described herein, a computer program product includes one or more memory devices with computer executable instructions stored thereon, the computer executable instructions when executed by one or more processors cause the one or more processors to perform a method. The method includes periodically performing a full system calibration of a measurement device that comprises a 3D scanner, a camera, and an auxiliary camera. The method further includes performing a limited system calibration of the measurement device in response to capturing a second 3D point cloud that is to be colorized, wherein the limited system calibration comprises updating a subset from the set of system calibration parameters using the second 3D point cloud and a second ultrawide-angle image from the auxiliary camera.

These and other advantages and features will become more apparent from the following description taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter, which is regarded as the invention, is particularly pointed out and distinctly claimed in the claims at the conclusion of the specification. The foregoing and other features, and advantages of embodiments of the invention are apparent from the following detailed description taken in conjunction with the accompanying drawings in which:

FIG. 9 depicts a table that provides the domains and ranges of various trigonometric functions;

The detailed description explains embodiments of the invention, together with advantages and features, by way of example with reference to the drawings.

DETAILED DESCRIPTION

Embodiments herein relate to a 3D measuring device having a 3D scanner and at least one camera to capture color images. The camera, in some embodiments, is a dual-ultrawide-angle lens camera. Embodiments of the technical solutions described herein provide advantages to acquiring three-dimensional (3D) coordinates of an area of the environment, acquiring a 2D color image of that area using the camera, and calibrating the 3D scanner and the 2D camera (system calibration) to facilitate mapping of the 2D image to the 3D coordinates. The result is an interactive 3D image of the area that includes the captured 3D coordinates and color. Embodiments provide advantages to perform a reliable system calibration.

By using the dual-ultrawide-angle lens camera facilitates reducing the time to acquiring the color images and colorizing the captured 3D coordinates, particularly in comparison to all existing techniques. In the existing techniques, the scanner system rotates (vertically and horizontally) to different viewing directions and the camera captures images. Depending on the camera field of view, the number of image capture varies. For a typical technological case, a built-in camera with a nodal point, which is identical to the laser scanner nodal point (no parallax), takes many images due to a narrow camera field of view. In other technological cases, in which the camera has a parallax to the laser scanner, a wider field of view camera is used. Using embodiments herein, a lower number of images are required in comparison to the built-in camera and external wide-angle camera techniques to cover 360° environment.

Further, a technical challenge with 3D measuring devices is that using collinearity conditions alone cannot precisely model the mapping of 3D points into an image space associated with the camera because of systematic errors. Typically, a sensor model, specific to the camera, is used to map the 3D points with the image space of the camera. However, the sensor model is based on one or more parameters that have to be determined and calibrated for the camera and 3D scanner to work together to provide precise 3D scans.

Figure 1:
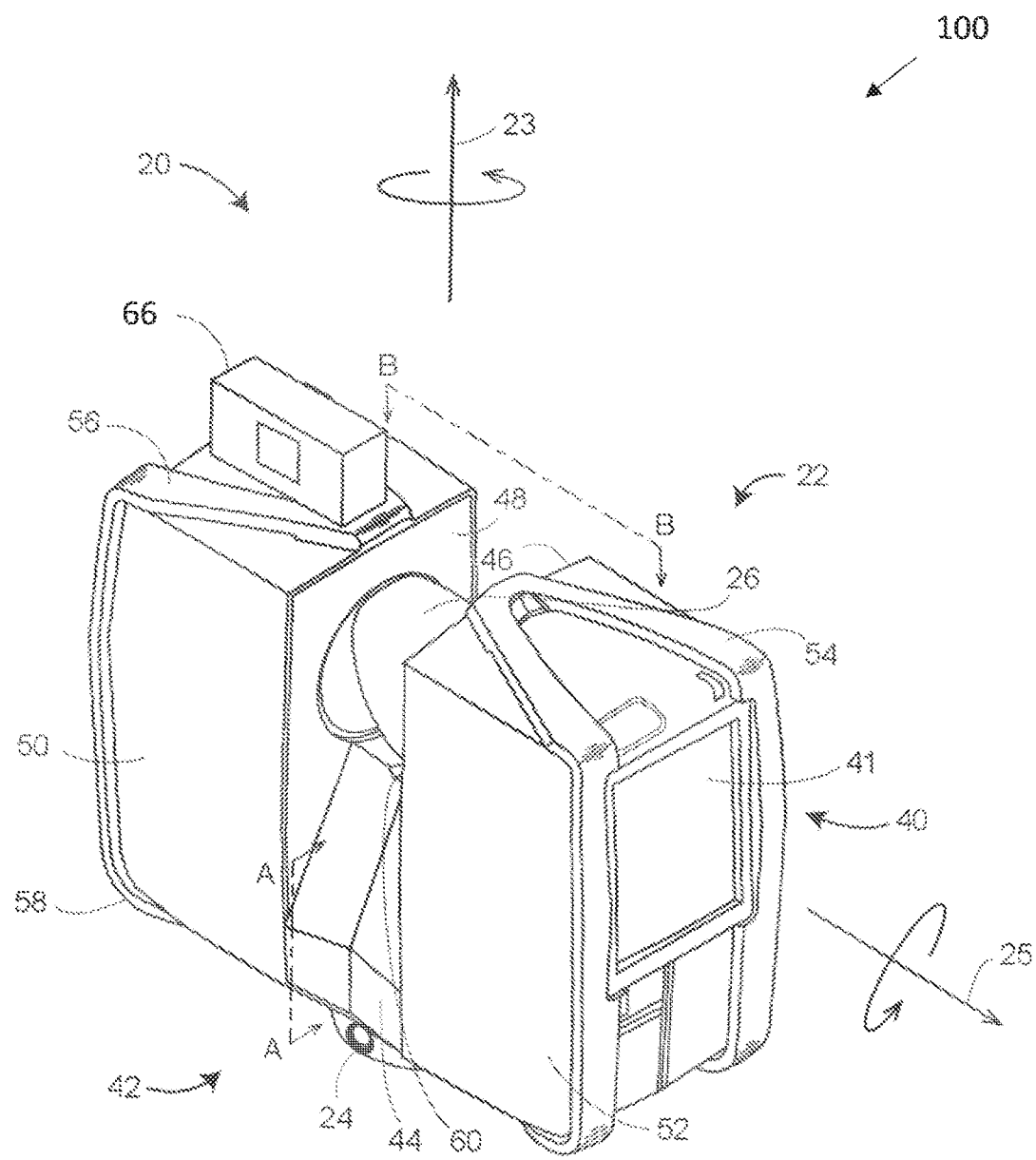
FIG. 1 is a perspective view of a laser scanner in accordance with an embodiment.
Figure 2:
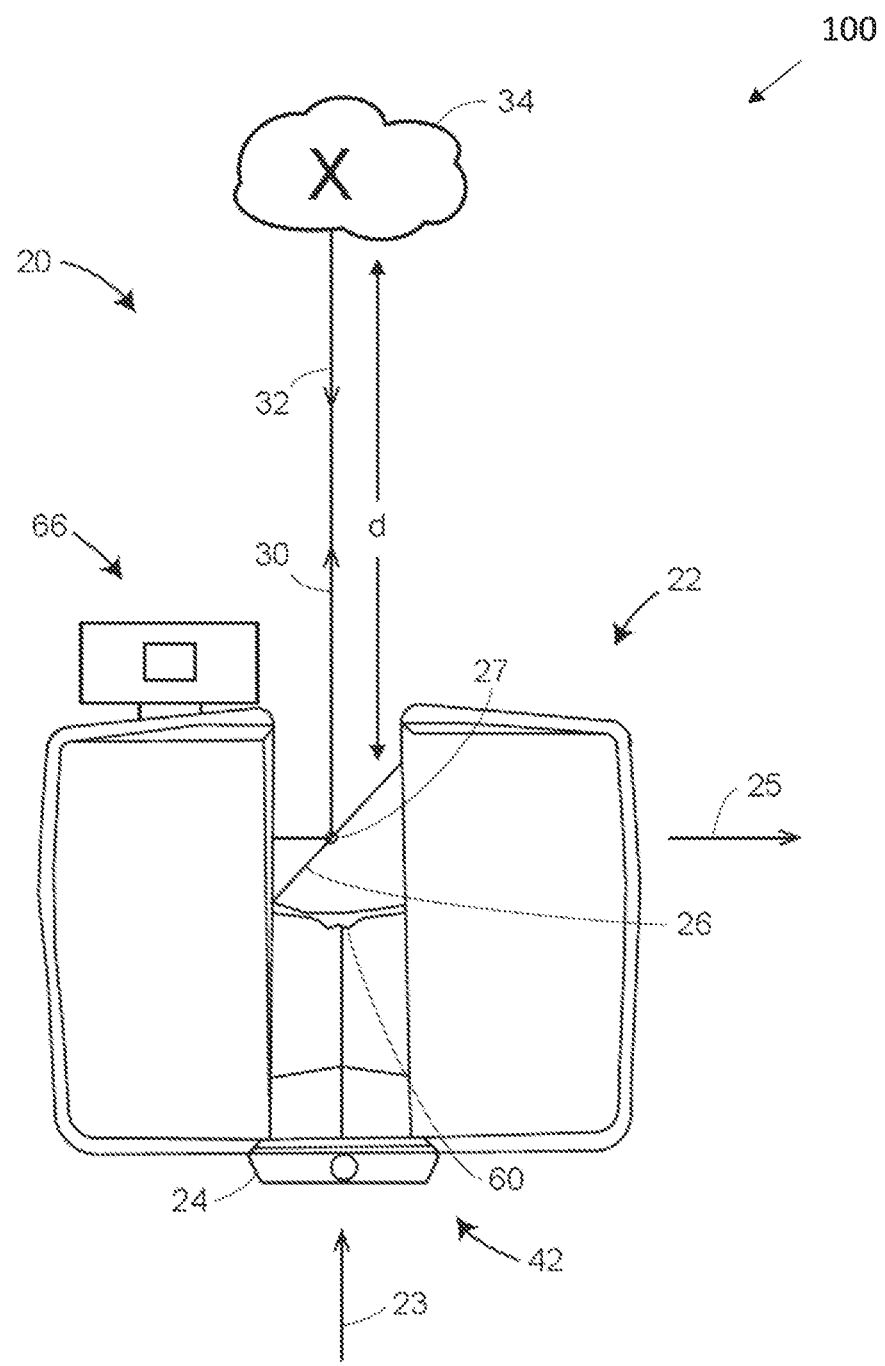
FIG. 2 is a side view of the laser scanner illustrating a method of measurement according to an embodiment.
Figure 3:
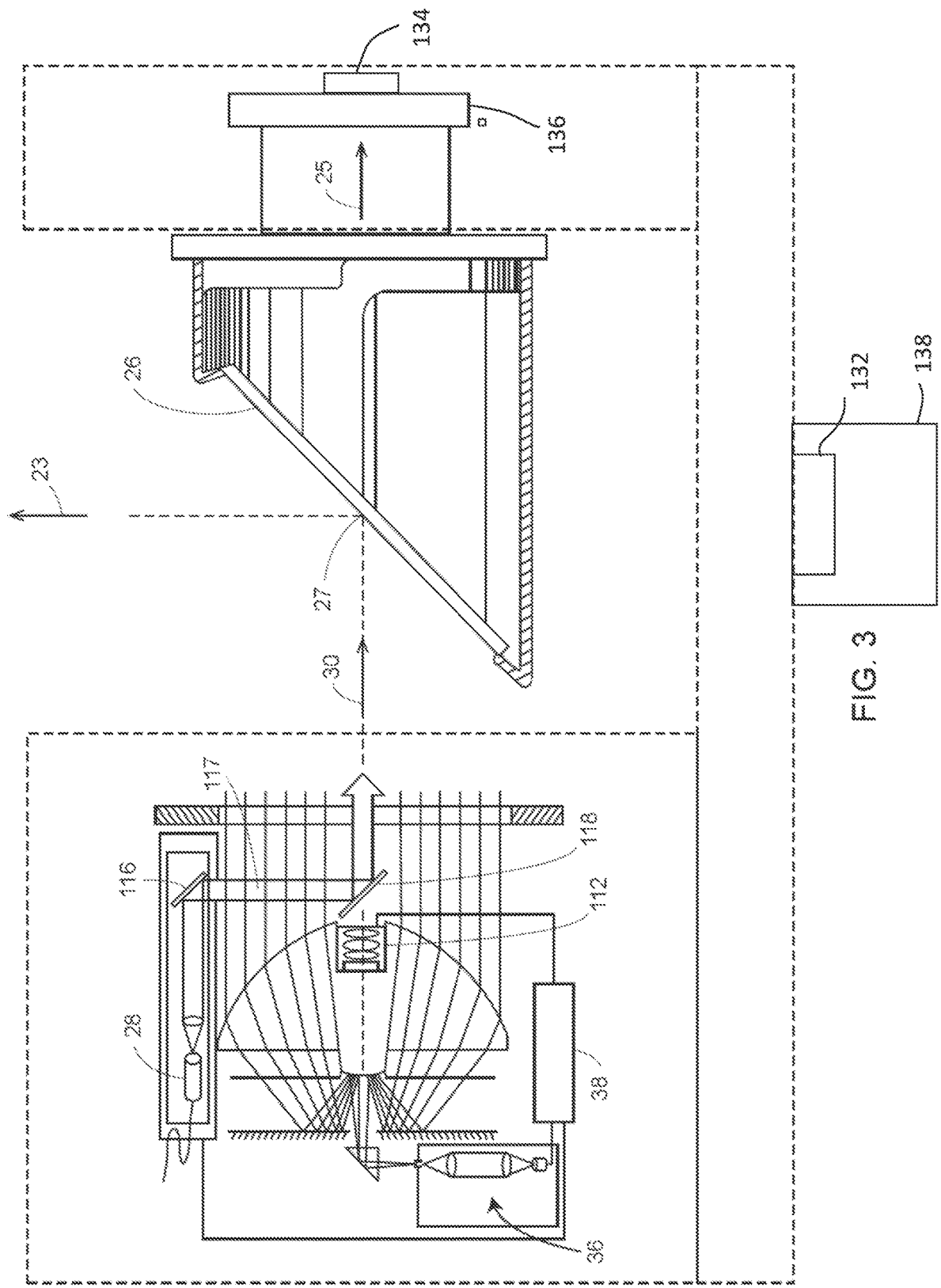
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera with an ultrawide-angle lens, sometimes referred to as a "fisheye camera."

In an embodiment, a camera 112 is located internally to the scanner (see FIG. 3) and may have the same optical axis as the 3D scanner device. In this embodiment, the camera 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The camera 112 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
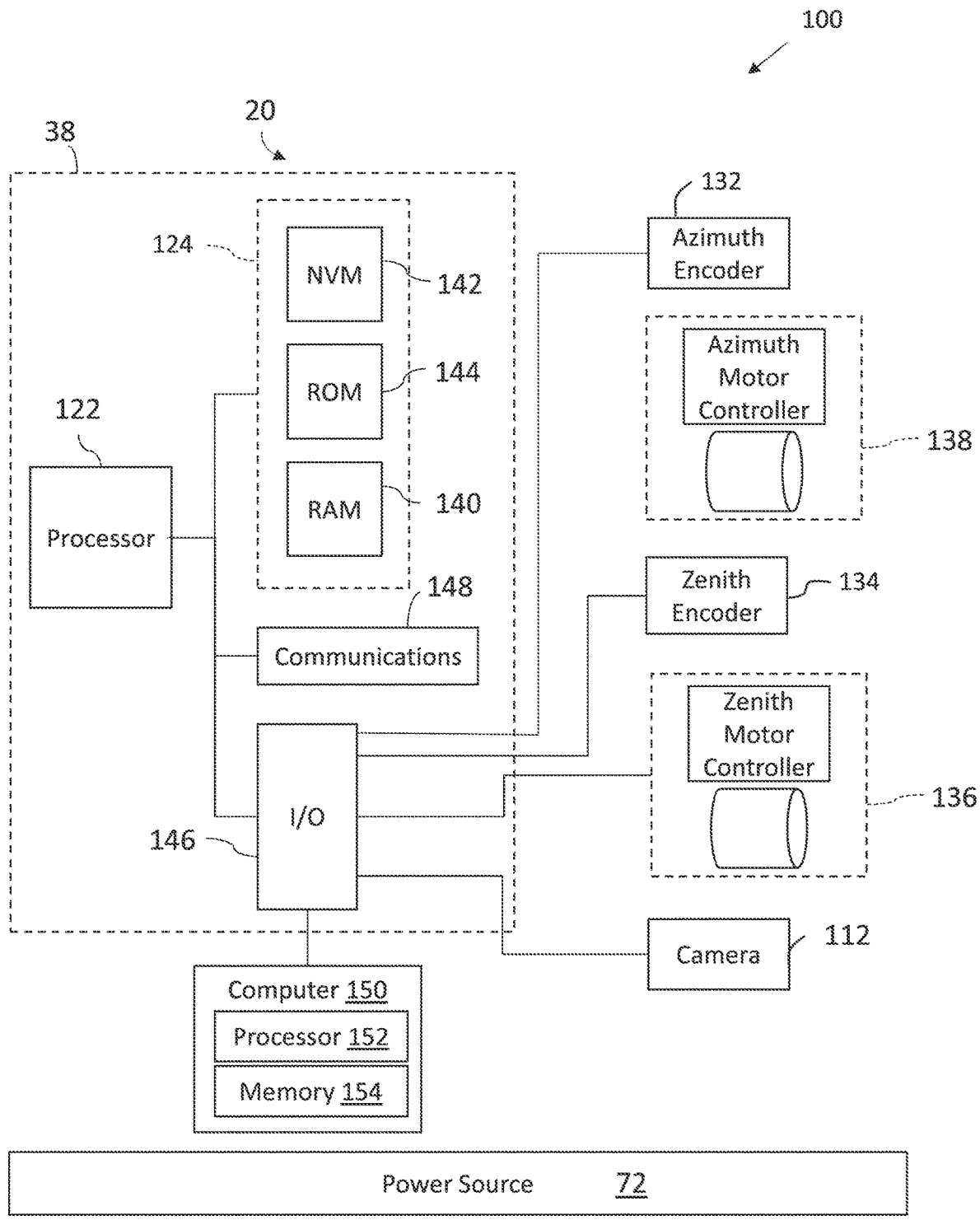
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by the camera 112, angular/rotational measurements by a first or azimuth encoder 132, and angular/rotational measurements by a second axis or zenith encoder 134.

In general, controller 38 accepts data from encoders 132, 134, light receiver 36, light source 28, and camera 112 and is given certain instructions for the purpose of generating a 3D point cloud of a scanned environment. Controller 38 provides operating signals to the light source 28, light receiver 36, camera 112, zenith motor 136, and azimuth motor 138. In one or embodiments, the controller 38 also provides operating signals to the auxiliary image acquisition device 66. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

In some embodiments, the controller communicates the captured data, i.e., point clouds and images, are captured to a computer 150. The computer 150 can include one or more processors 152 and a memory device 154. The computer 150 generates a 3D colorized image by colorizing the 3D coordinates in the point clouds using the color images from the 2D camera 66. Such colorization requires that the measurement device 100, which is a system of multiple devices, e.g., the 3D scanner 20 and the camera 66 is calibrated.

Figure 5:
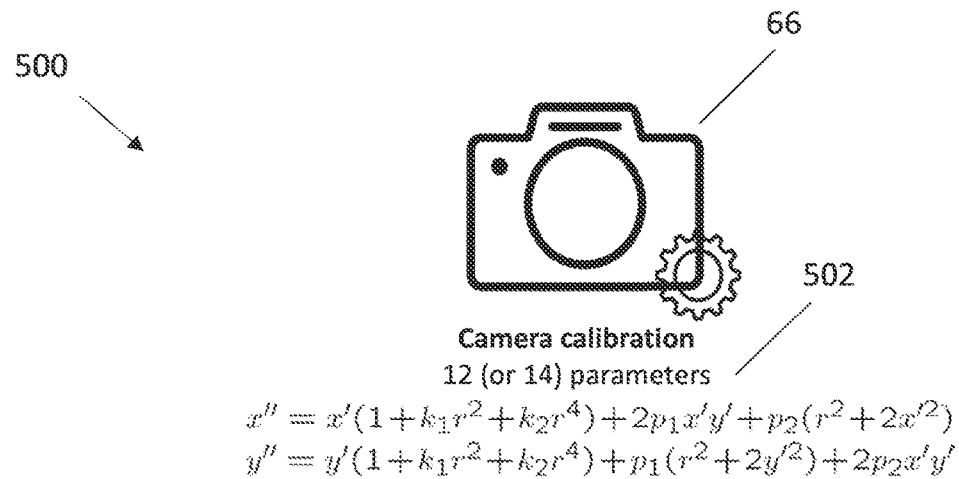
FIG. 5 depicts different types of system calibration parameters according to one or more embodiments.
Figure 5:
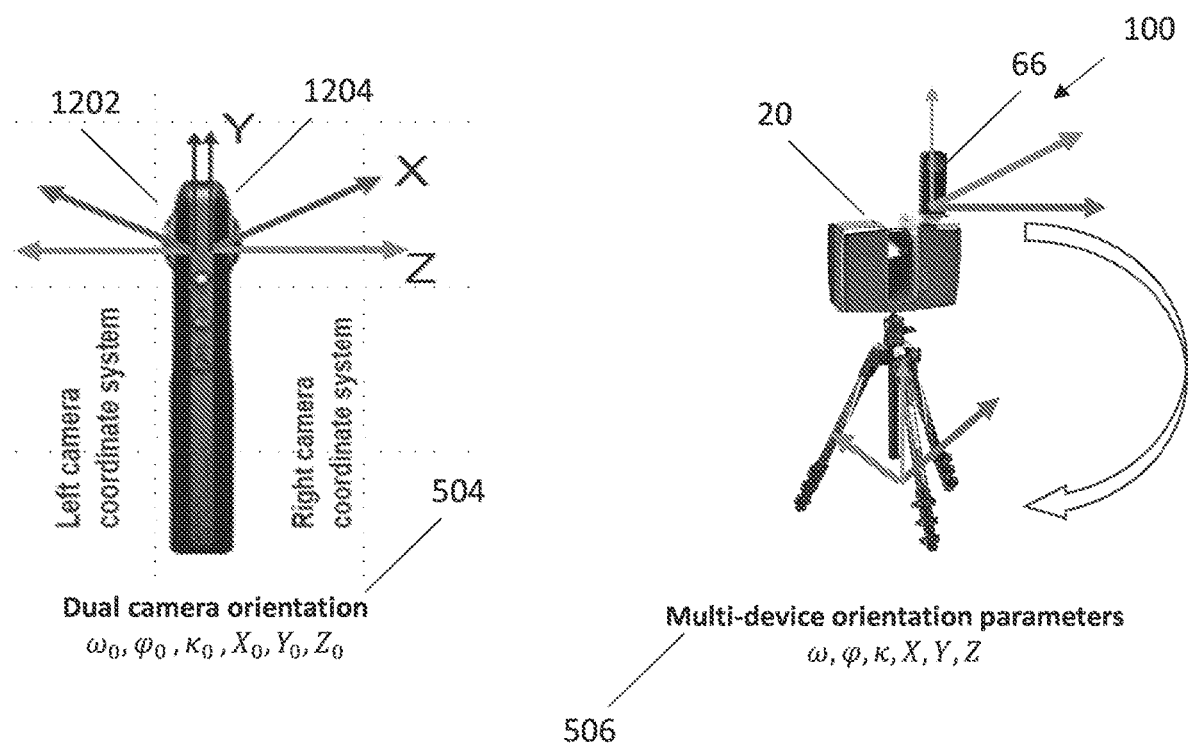

FIG. 5 depicts different types of system calibration parameters according to one or more embodiments. System calibration parameters 500 include the following sets of parameters: camera calibration parameters 502, (e.g., 12 parameters); dual camera orientation parameters 504, (e.g., 6 parameters); and multi-device orientation parameters 506, e.g., orientation of the camera 66 with respect to scanner 20 (e.g., 6 parameters). It is understood that the parameters in each of the above set of parameters can vary in other embodiments. In some embodiments, the camera calibration parameters 502 are referred to as dc, $dx_0$, $dy_0$, $k_1$, $k_2$, $k_3$, $p_1$, $p_2$ for frame array cameras with rectilinear lenses or 12 parameters for frame array cameras with fisheye lens as follows: $dc_1$, $dc_2$, $dx_0$, $dy_0$, $k_{11}$, $k_{12}$, $k_{13}$, $k_{21}$, $k_{22}$, $k_{23}$, $p_1$, $p_2$. The dual camera orientation parameters 504 are $\omega_0$, $\varphi_0$, $\kappa_0$, $X_0$, $Y_0$, $Z_0$. Here, ($\omega_0$, $\varphi_0$, $\kappa_0$) are the relative angular orientation of the left camera coordinate system with respect the right camera coordinate system; and ($X_0$, $Y_0$, $Z_0$) are relative position of the projection center of the right camera with respect to the projection center of the left camera (1202, 1204). Further, the multi-device orientation parameters also include 3 angles and 3 coordinates $\omega$, $\varphi$, $\kappa$, X, Y, Z. Here, ($\omega$, $\varphi$, $\kappa$) are the three relative rotation angles of the coordinate system of the left camera at 66 and the coordinate system of the scanner 20; and (X, Y, Z) are the relative position of the coordinate system of the left camera at 66 and the coordinate system of the scanner 20.

Reliably calibrating the measurement device 100, i.e., acquiring all system calibration parameters 500, and maintaining the calibration throughout the use of the measurement device is a technical challenge. The reliability of system calibration depends on the feature distribution and the number of features available in a 360° field of view of the me. Another factor influencing the quality and success of system calibration is the number of matched features in the data (e.g., intensity image) from the 3D scanner 20 and the data (e.g., color image) from the camera 66. Because the type of light captured by the laser intensity image (active: reflectance of laser from the object surface) from the 3D scanner 20 is different from that in the color image (passive: reflective of natural light from the surface) from the camera 66, the number of matched features in these two types of captured data can be smaller than a required predetermined threshold. This can pose a technical challenge that prevents performing the system calibration.

Technical solutions are described herein to address such technical challenges by providing on-the-fly system calibration. The system calibration can use two phases. A first phase is a full system calibration (FSC), which determines the entire set of system calibration parameters 500. A second phase is a limited system calibration (LSC), which determines a partial set of the system calibration parameters 500. Both phases can be performed on-the-fly, and independent of each other.

The FSC facilitates to determine the following: full estimation of camera calibration parameters 502 (2×12 parameters); full estimation of dual camera orientation parameters 504, (e.g., 6 parameters); and full estimation of multi-device orientation parameters 506 (6 parameters). In the example case of FIG. 5, FSC can determine 2×12+6+6=36 parameters. FSC does not use initial values to determine the system calibration parameters 500. Rather, FSC uses feature extraction, feature matching, and on-the-fly control point construction, which is described herein. The feature extraction and matching are performed using a laser color image, which is created by stitching the color images captured by the built-in (internal) camera 112 of the laser scanner 20. In some embodiments, the feature extraction and matching uses at least two panoramic images. The feature extraction and matching are performed with point clouds captured by a laser scan that the scanner 20 performs. The scanner 20 can be configured to use at least a predetermined lower resolution, for example, 25% of maximum resolution, to facilitate the laser scan to be captured faster, and yet detect features that can be used for the calibration.

In case of the LSC, a partial set of the system calibration parameters 500 are determined on-the-fly. For example, in some embodiments, the LSC facilitates to determine the following: full or partial estimation of camera calibration parameters 502 (fully or partially 2×12 parameters); full estimation of dual camera orientation parameters 504, (e.g., 6 parameters); and full estimation of multi-device orientation parameters 506 (6 parameters). In the example case of FIG. 5, LSC can determine all or part of 2×12+6+6=36 parameters. LSC is performed to update initial values of the system calibration parameters 500 (as opposed to determining them from scratch in FSC). In some embodiments, the system calibration parameters determined by FSC are used as initial values that are updated by LSC. In some embodiments, while performing LSC, the initial values of system calibration parameters 500 are used to perform a hybrid feature matching, in which a search space domain is constructed to perform the feature matching more efficiently. In some embodiments, the feature extraction and matching for the LSC uses a single panoramic image. The feature extraction and matching are performed with respect to point clouds captured in a laser scan by the scanner 20. The scanner 20 can be configured to use a second predetermined resolution, for example, 20% of maximum resolution, to facilitate the laser scan to be captured faster. The second predetermined resolution can be lower than the predetermined resolution used for the FSC.

Figure 6:
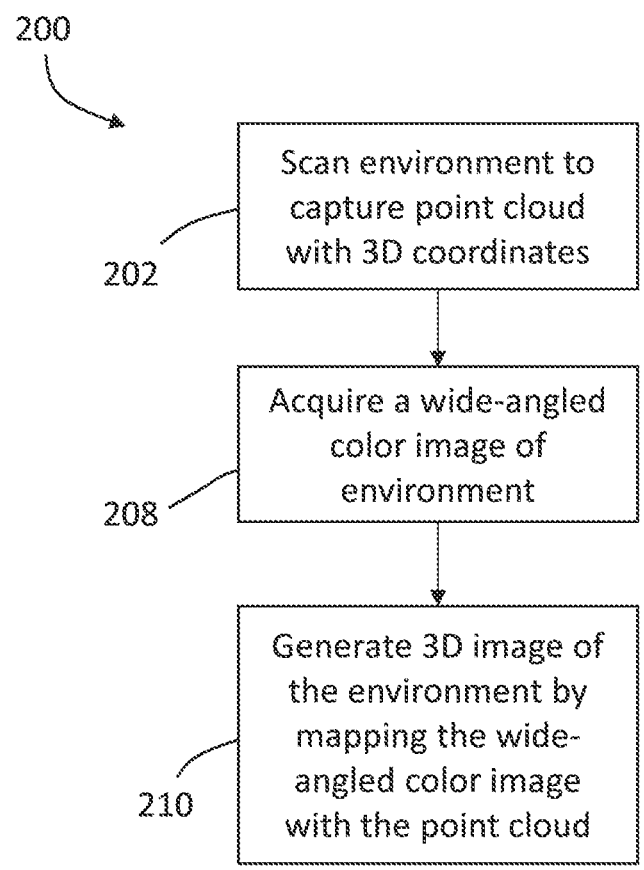
FIG. 6 is a flow diagram of a method of generating enhanced color scans with the laser scanner of FIG. 1.

Referring now to FIG. 6, an embodiment of a method 200 is shown for generating a scan of the environment with the scanner 20. The method 200 begins in block 202 where the environment in which the scanner 20 is positioned is scanned. As described herein, the volume (e.g. the scan area) around the laser scanner 20 is performed by rotating the rotary mirror 26 relatively quickly about axis 25 while rotating the measuring head 22 relatively slowly about axis 23, thereby moving the assembly in a spiral pattern. Thus, for each light beam emitted, a distance value and the angles of the mirror 26 and the measurement head 22 is determined. Thus, a 3D coordinate of a point in the environment may be determined for each emitted and received light beam. Further, for each light beam, an intensity value of the returned light beam is measured.

The light beams are emitted and received as the measurement head 22 is rotated 180 degrees about the axis 23. The method 200 further includes, at block 208, acquiring color images of the environment. In an embodiment, a 2D color image is acquired by the auxiliary image acquisition device 66. One or more 2D images are acquired using the ultrawide-angle lens captures color data in the spherical volume surrounding the laser scanner 20. In the exemplary embodiment, the 2D acquired color images are in an RGB color model. In other embodiments, other color models, e.g., cyan, magenta, and yellow (CMY), or cyan, magenta, yellow, and black (CMYK), or any other color model can be used.

Once the 2D color image is acquired, the method 200 includes, at block 210, generating a colorized 3D image by mapping the 2D ultrawide-angle image with the 3D coordinates in the point cloud captured by the scanner 20. Such mapping of the 2D ultrawide-angle image with the 3D point cloud is described further herein.

It should be appreciated that the method 200 provides advantages in generating enhanced color 3D scans over techniques that use HDR (High Dynamic Range) imaging techniques because of requiring fewer number of images to be captured by using an ultrawide-angle field of view.

Physical agents living in complex environments, such as humans and animals, use two types of visual sensing abilities. One is to focus on objects with a precise but small retina and the other is to look around the environment with a wide but coarse retina. Both visual sensing mechanisms are used to enable robust and flexible visual behaviors. In particular, the wide visual information obtained by looking around is used to monitor wide areas and to avoid undesired situations. If the complete surrounding in space can be involved into the perception process, orientation and navigation in space becomes easier and more reliable.

Typically, a camera's field of view is smaller than the human field of view, which limits objects from being captured in a single picture. This technical challenge is addressed by using a ultrawide-angle, i.e., hemispherical or fisheye lens, which creates a wide field of view image. With a ultrawide-angle lens an image of more than 180° angular field of view can be acquired. Due to the large field of view, it has been used in many applications with different domains such as forestry, the study of plant canopies, geodesy to produce a site obstruction diagram for future GPS missions, etc.

Technical challenges of using such a ultrawide-angle lens include lateral color, high order distortion (edge compression), loss of resolution and severe drop-off of illumination at the full field (e.g., 180°), which limit applications of the ultrawide-angle lenses for precise photogrammetric applications.

Embodiments of the technical solutions described herein address such technical challenges and facilitate using the ultrawide-angle lens to acquire 2D color images and mapping such images to the 3D coordinates in the point cloud. Further, technical effects and benefits of some embodiments include providing a 3D measurement device 100 that rapidly acquires 3D coordinates of a collection of points in a scan area with accurate color information using the single ultrawide-angle 2D color image. In one or more embodiments, the auxiliary image acquisition device 66 can be an omnidirectional camera such as a RICOH® THETA® camera for example. The camera 66 can capture a 360° view of the environment by capturing two images substantially concurrently. The two images may be captured by two ultrawide-angle lenses that are positioned to be facing in opposite directions, each camera capturing a respective field of at least 180°. In some cases, the two images that are captured can have overlapping portions that can be combined/edited, either automatically or manually. It is understood that above description provides some examples of the ultrawide-angle lens, and auxiliary image acquisition device 66 that can be used in one or more embodiments, and that in other embodiments, different lenses and/or cameras can be used.

Figure 7:
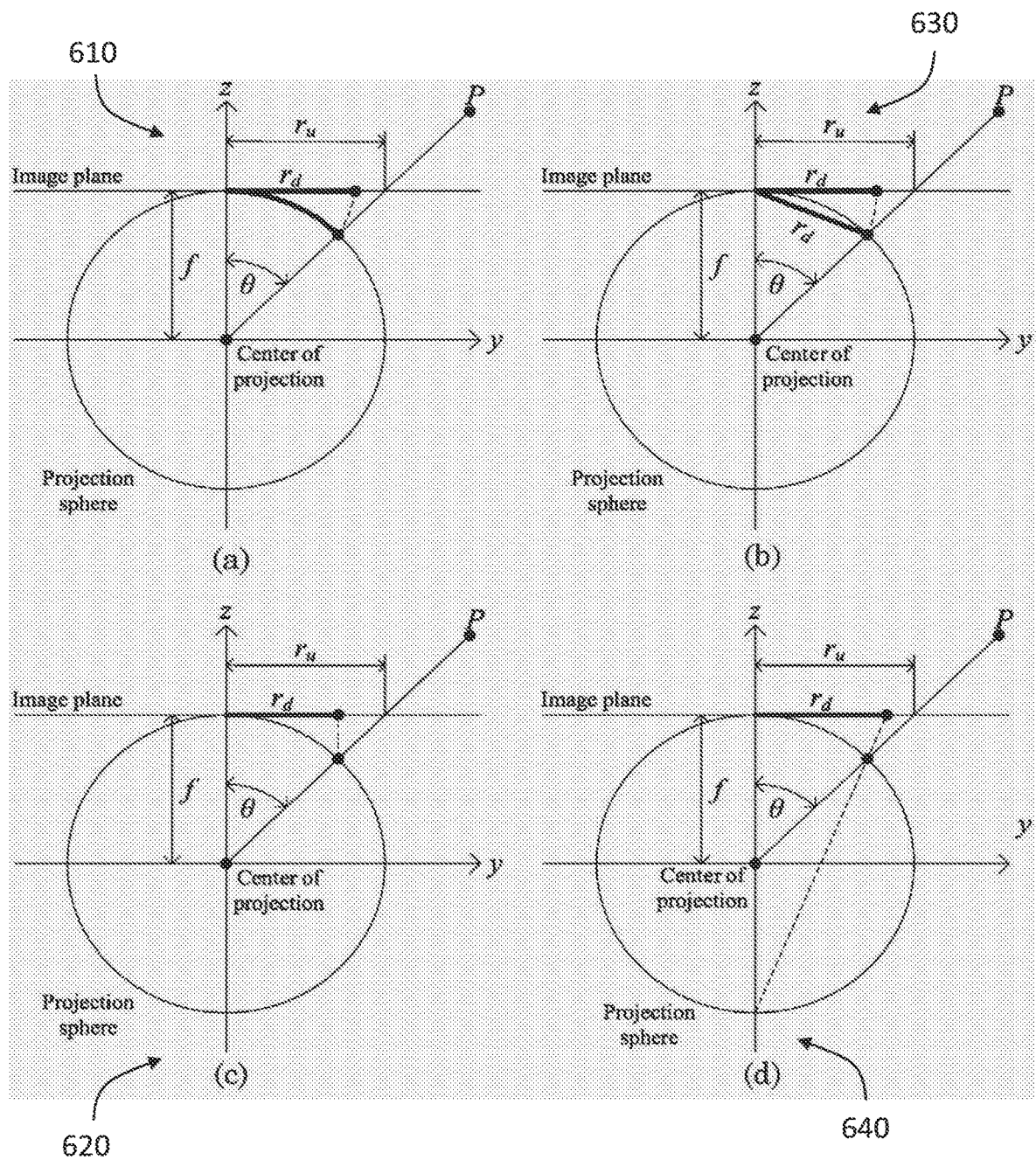
FIG. 7 depicts the projection types of ultrawide-angle (fisheye) lens and the path of light from a point in 3D space into the image plane.

FIG. 7 depicts determining coordinates corresponding to pixels representing objects/surfaces captured by an ultrawide-angle image according to one or more embodiments. A difference between an ultrawide-angle lens and a typical rectilinear lens is that the projection from a 3D point to a 2D image in the ultrawide-angle lens is intrinsically non-perspective. Depending on the amount of deviation of the ray, equations below, and FIG. 7 provide four different types of projections which characterize ultrawide-angle lenses:

$$\text{Equidistant projection (610): } r_d = c \cdot \theta$$

$$\text{Orthographic projection (620): } r_d = c \cdot \sin(\theta)$$

$$\text{Equisolid-angle projection (630): } r_d = 2c \cdot \sin\left(\frac{\theta}{2}\right)$$

$$\text{Stereographic projection (640): } r_d = 2c \cdot \tan\left(\frac{\theta}{2}\right)$$

Figure 8:
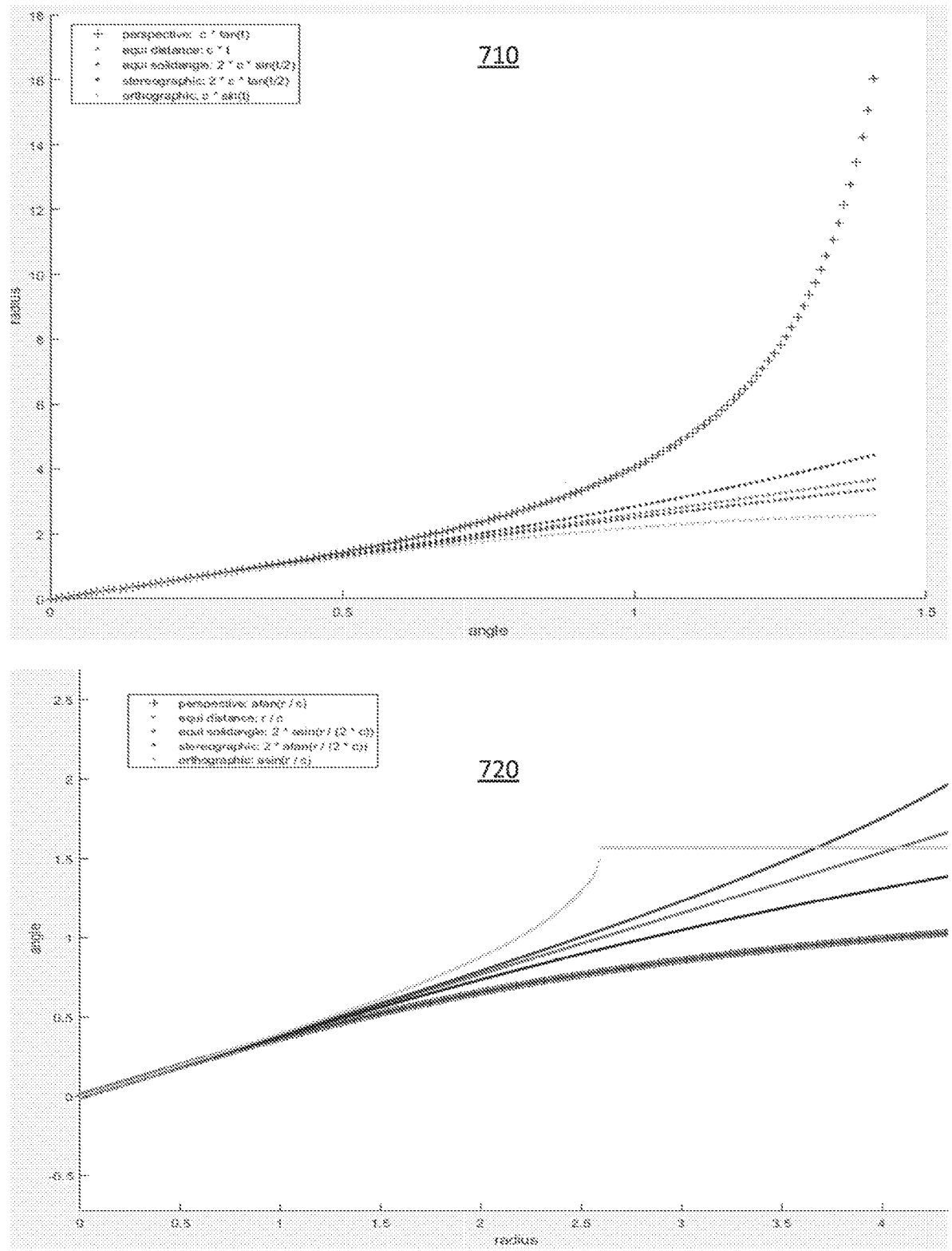
FIG. 8 shows the relation of radius and zenith angle (and reverse) for all ultrawide angle (fisheye) lens types at FIG. 7 including also the perspective projection.

Here, $\theta$ is the zenith angle, c is a camera constant (in millimeter or pixels), and $r_d$ is the radius of the image point P (from the principal point). FIG. 8 shows the relation of radius and zenith angle (and reverse) for perspective projection and the four ultrawide-angle lens projection types 610, 620, 630, 640. The plot 710 shows that a lens with perspective projection requires an infinite image plane to projection near (and less) than 180° field of view. The plot 720 shows that orthographic projection type cannot handle field of view near (and more) than 180°. Typically, lenses available are designed to produce an equidistant projection. For example, NIKON® 8-mm f/2.8, CANON® 7.5-mm f/5.6, SIGMA® 15-mm f/2.8 (180° FOV), NIKON® 6-mm (220° FOV), and RICOH® THETA® ultrawide-angle lens 2.6-mm (~204° FOV) are examples of equidistant projection ultrawide-angle lenses.

Collinearity equations represent a set of two equations, used in photogrammetry and remote sensing to relate coordinates in a sensor plane (in two dimensions) to object coordinates (in three dimensions). Equation (1) represents collinearity equations for a 2D ultrawide-angle lens as used in one or more embodiments:

$$\left.\begin{array}{l} x = -\dfrac{c}{m} \cdot \dfrac{U_X}{U_Z} \\ y = -\dfrac{c}{m} \cdot \dfrac{U_Y}{U_Z} \end{array}\right\} \quad (1)$$

Here, (x, y) is the image point coordinates in the photo coordinate system (e.g., millimeter or pixels), c is the camera constant, m is a ultrawide-angle lens coefficient factor (unit free). The ($U_X$, $U_Y$, and $U_Z$) are intermediate values that can be computed as follows:

$$\begin{pmatrix} U_X \\ U_Y \\ U_Z \end{pmatrix} = R^t \cdot \begin{pmatrix} X - X_0 \\ Y - Y_0 \\ Z - Z_0 \end{pmatrix}$$

Here, ($X_0$, $Y_0$, $Z_0$) is the position of the center of projection (see FIG. 7), and (X, Y, Z) is the resulting object point coordinates in 3D space, and $R = R_X \, R_Y \, R_Z$, in which:

$$R_X = \begin{pmatrix} 1 & 0 & 0 \\ 0 & \cos(\omega) & -\sin(\omega) \\ 0 & \sin(\omega) & \cos(\omega) \end{pmatrix}, R_Y = \begin{pmatrix} \cos(\varphi) & 0 & \sin(\varphi) \\ 0 & 1 & 0 \\ -\sin(\varphi) & 0 & \cos(\varphi) \end{pmatrix}, \text{ and }$$

$$R_Z = \begin{pmatrix} \cos(\kappa) & -\sin(\kappa) & 1 \\ \sin(\kappa) & \cos(\kappa) & 1 \\ 0 & 0 & 1 \end{pmatrix},$$

where ($\omega$, $\varphi$, $\kappa$) are the three rotation angles around the X, Y, and Z axes respectively. The point at coordinates (X, Y, Z) in the 3D point cloud is mapped and colorized with the pixel at (x, y) from the 2D ultrawide-angle image as a result of the above calculations.

Only the equidistant projection (610), and the equisolid-angle projection (630) types can properly model the Ricoh Theta ultrawide-angle lens. Accordingly, examples described herein provide equations that are applicable for those two projection models, however, it is understood that other types of projection models can be used without significant changes to the description provided herein. For example, the following are the calculations for the lens coefficient, m, for the equidistant and the equisolid-angle projection types for the ultrawide-angle lens:

$$\text{Equidistant projection coefficient: } m = -\frac{\tan(\theta)}{\theta}$$

$$\text{Equisolid-angle coefficient: } m = -\frac{\tan(\theta)}{2 \cdot \sin\left(\dfrac{\theta}{2}\right)}$$

It should be noted that in the case of the ultrawide-angle lens of the auxiliary image acquisition device 66, the range of $\theta$ is [0, $\pi$]. Among the trigonometric functions, only the inverse of cosine or the inverse of cotangent return the angle in the range of [0, $\pi$] (for inverse of cotangent is (0, $\pi$)). Accordingly, one or more embodiments use the inverse of cosine (a cos) to determine the angle theta. Inverse of sine or inverse of tangent do not have this property. If they are used in the formulation, they cannot determine the sign and the value of $\theta$ for incoming rays with $\theta$ near to $\pi/2$ or larger than $\pi/2$ (FOV of near to $\pi$ or larger than $\pi$). FIG. 9 depicts a table 810 that provides the domains and ranges of various trigonometric functions. Based on these, the above described calculations of the camera coefficient m are based on using the following computation for the angle $\theta$:

$$\theta = \cos^{-1}\left(-\frac{U_Z}{\sqrt{U_X^2 + U_Y^2}}\right)$$

The above described calculation resolves the ambiguity of mapping the 3D point cloud captured by the laser scanner 20 to pixels from the 2D ultrawide-angle color image from the auxiliary image acquisition device 66 at near to or larger than zenith angle of 90°. By using the above techniques for calculating the angle θ embodiments described herein eliminate disambiguation of the sign and value of the angle θ. Therefore, the coefficient m and the further calculations that use m are calculated correctly Typically, during mapping an image to a point cloud, straight lines in the real world (i.e., point cloud) are mapped to straight lines in the image generated by the rectilinear camera. However, most real optical systems introduce some undesirable effects, rendering the assumption of the rectilinear camera model inaccurate. In the case of the auxiliary image acquisition device 66, a radial distortion (also referred to as "radial barrel distortion") causes points on the image plane to be shifted from their ideal position along a radial axis from the principal point in the ultrawide-angle image plane. The visual effect of this displacement in ultrawide-angle optics is that the image has a higher resolution in the foveal areas, with the resolution decreasing nonlinearly toward the peripheral areas of the image.

Typically, the following set of equations are used to determine correction terms to image point coordinates. The equations use additional parameters for modeling the systemic errors of frame array cameras with rectilinear lenses.

$$\Delta x = dx_0 - \frac{\overline{x}}{c}dc - S_x\overline{x} + a\overline{y} + \overline{x}(r^2k_1 + r^4k_2 + r^6k_3) + (r^2 + 2\overline{x})p_1 + 2\overline{xy}p_2$$
$$\Delta y = dy_0 - \frac{\overline{y}}{c}dc + a\overline{x} + \overline{y}(r^2k_1 + r^4k_2 + r^6k_3) + 2\overline{xy}p_1 + (r^2 + 2\overline{y})p_2$$

(2)

Here, dc is a correction to camera constant c, $(dx_0, dy_0)$ represents corrections to the shift of principal point $(x_0, y_0)$, $(S_x, a)$ are affine transformation parameters: scale difference and shear, $k_1, k_2, k_3$ are parameters of radial lens distortion, and $p_1, p_2$ are parameters of decentering lens distortion.

It is known, that in modern electronic sensor manufacturing, the terms $(S_x, a)$ are negligible therefore, equations (2) consists of 8 camera calibration parameters which are determined through the process of camera self-calibration. A technical challenge is that such camera calibration parameters introduce systemic errors that inhibit the accurate colorizing of the 3D point cloud using the single 2D ultrawide-angle color image. It should be noted that although eight camera calibration parameters are depicted in equations (2), in other embodiments there can be a different number of camera calibration parameters.

Embodiments herein address such technical challenges by facilitating system calibration 500.

Typically, system camera calibration through self-calibration can be performed in three ways: first, block triangulation with free network; second, block triangulation with object space constraints for example, control points or 3D straight lines; and third, space resection of individual images using control points. In the first and second approach, using bundle adjustment, the camera calibration parameters, the exterior orientation parameters of images, and the position of the object points are estimated simultaneously through a least-squares-optimization approach. Here, "bundle adjustment" is a known algorithm or process that is used in 3D construction techniques. Given a set of images depicting a number of 3D points from different viewpoints, bundle adjustment can be defined as the problem of simultaneously refining the 3D coordinates describing the scene geometry, the parameters of the relative motion, and the optical characteristics of the camera(s) employed to acquire the images, according to an optimality criterion involving the corresponding image projections of all points.

In the third approach, the control points are used, and the system calibration parameters 500 which are the camera calibration parameters, and the external orientation parameters of the images are estimated simultaneously. In the case of the setup of the 3D scanner 20 and the auxiliary image acquisition device 66, the latter being fixed to the 3D scanner 20, the system camera calibration has to be performed using the third approach that uses space resection of individual images using control points. This technique is now described.

Typically, in photogrammetry, a test-field of control points is built in order to calibrate the system 500 including a laser scanner 20 and a camera 66, and to perform an accuracy testing of the calibration procedure. This control point test-field is typically measured with a technique, which has a better positioning accuracy compared to the intended accuracy that is aimed to be achieved after the system calibration. Then, using the bundle adjustment process the system calibration parameters 500 which includes the camera calibration parameters and exterior orientation parameters of the images are estimated simultaneously.

However, in the case of the 3D scanner 20 with the fixed auxiliary image acquisition device 66, the system has to be calibrated at locations which are not in a control point test-field. Therefore, using a test-field of control points to perform a regular system calibration for data captures at locations where the 3D scanner 20 is going to be used is not a practical approach. Accordingly, embodiments described herein facilitate dynamically building a test-field of control points by using a point cloud that is captured by the 3D scanner 20. The control points of this test-field are selected points from the point cloud.

Figure 10:
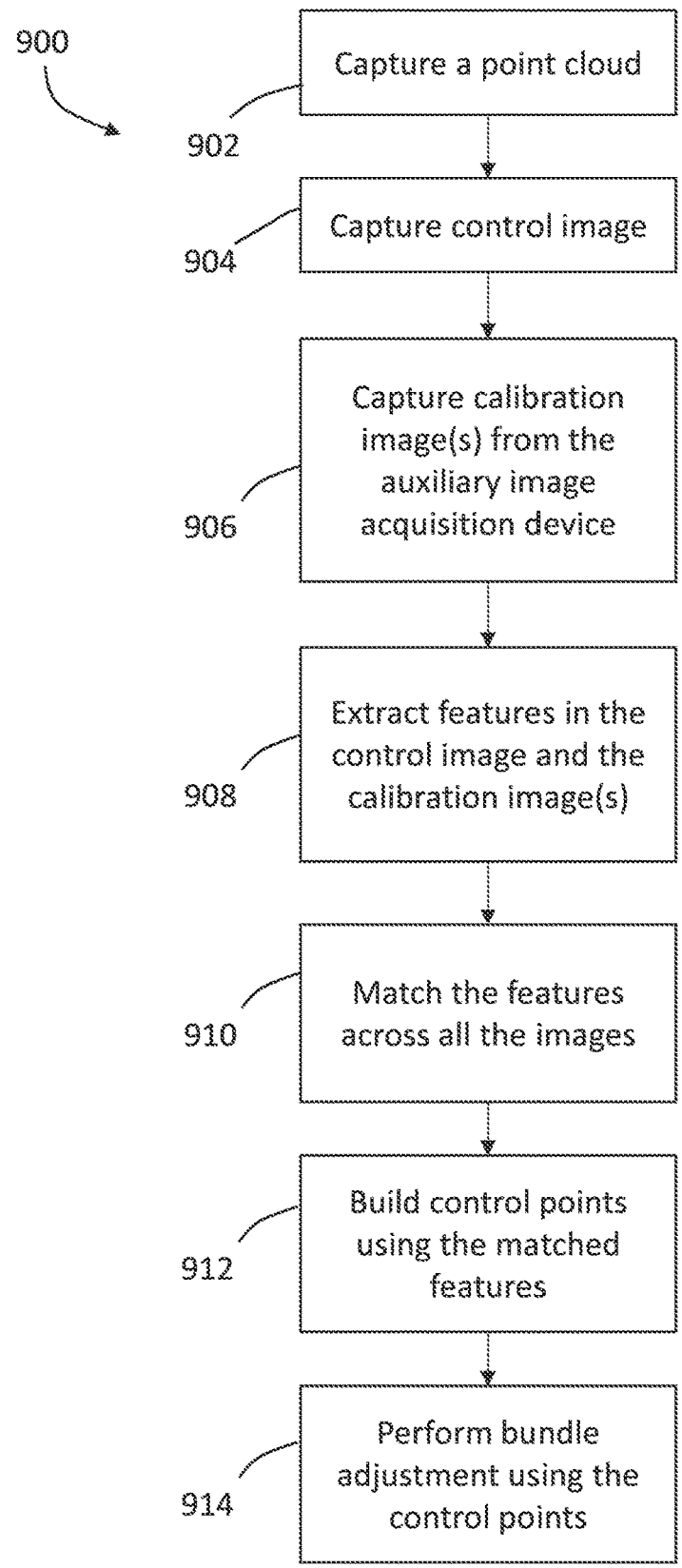
FIG. 10 depicts a flowchart for a dynamic construction of control points for calibrating the auxiliary image acquisition device according to one or more embodiments.

FIG. 10 depicts a flowchart for a dynamic construction of control points for system calibration according to one or more embodiments. The method 900 includes capturing a point cloud using the 3D scanner 20, at block 902. Further, a control image is captured using the camera 112 that is integrated with the 3D scanner 20, at block 904. In one or more embodiments, multiple images are captured using the integrated camera 112, and the images are stitched together. Alternatively, in the case that the 3D scanner 20 does not have an integrated camera 112, an intensity image is captured and used as the control image. The intensity image does not have color information (e.g., Red, Green, Blue (RGB), or Cyan, Magenta, Yellow (CMY) etc.), rather has light intensity information at each captured pixel in the image. Further, calibration images are captured by the auxiliary image acquisition device 66, which is to be calibrated, at block 906.

Method 900 further includes extracting natural features in all of the images that are captured, at block 908. All the images here include the control image taken by the internal camera 112 (or the intensity image) and the calibration images taken by the auxiliary image acquisition device 66. Feature extraction can be performed using one or more known algorithms such as, Harris corner detector, Harris-Laplace-scale-invariant version of Harris detector, multi-scale oriented patches (MOPs), scale invariant feature transform (SIFT), speeded up robust features (SURF), Features from accelerated segment test (FAST), binary robust invariant scalable key-points (BRISK) algorithm, oriented FAST and rotated BRIEF (ORB) algorithm, KAZE with M-SURF descriptor, and any other feature extraction technique. Some of the feature extraction techniques such as, SIFT, SURF, BRISK and ORB also provide descriptors for the extracted features. Alternatively, or in addition, any feature descriptor definition can be associated to the extracted features. For example, the following descriptor definitions can be used: normalized gradient, principal component analysis (PCA) transformed image patch, histogram of oriented gradients, gradient location and orientation histogram (GLOH), local energy-based shape histogram (LESH), BRISK, ORB, fast retina key-point (FREAK), and local discriminant bases (LDB).

In an embodiment, the feature extraction is based on a modified AKAZE algorithm which is executed on a graphics processing unit (GPU) to increase runtime efficiency. The descriptors assigned to the extracted features are the modified version of the M-SURF descriptors. The feature extraction results include a collection of points from each image, each point in the collection being an extracted "feature." The criteria for extracting such features can include detecting semantic features from the images such as, corners, edges, doors, windows, etc. Alternatively, or in addition, the feature extraction can include detecting points that provide combinations of parameters that facilitate reducing the number of features required to processed for effective feature matching. For example, such feature dimensionality reduction can include techniques such as principal component analysis (PCA), autoencoder, subspace learning, semidefinite embedding, isomap, partial least squares, etc.

Figure 11:
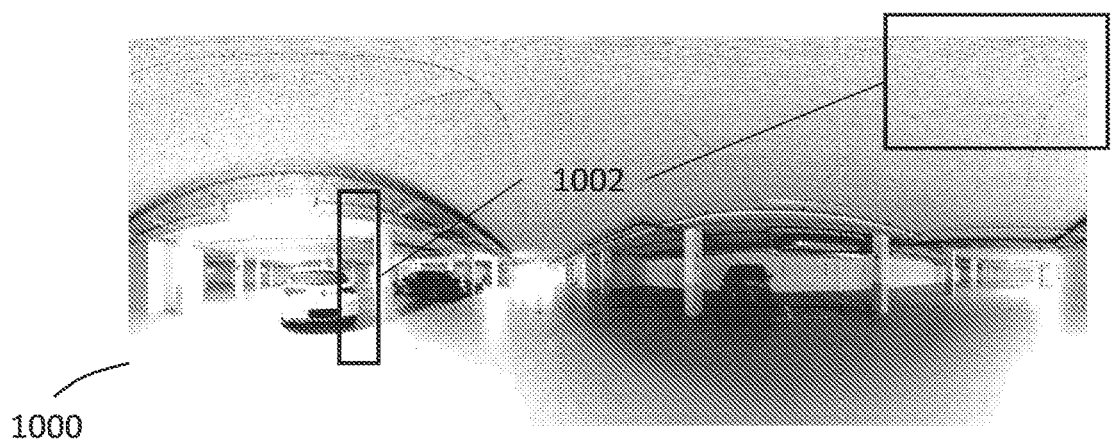
FIG. 11 depicts example control image and calibration image used for a dynamic construction of control points for calibrating the auxiliary image acquisition device according to one or more embodiments.
Figure 11:
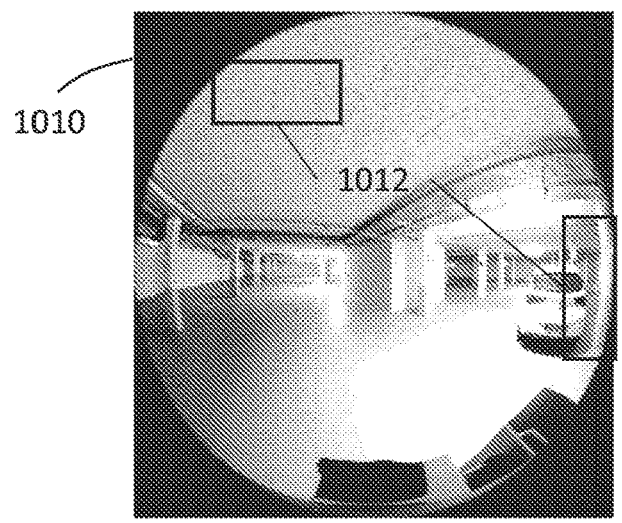
Figure 11:
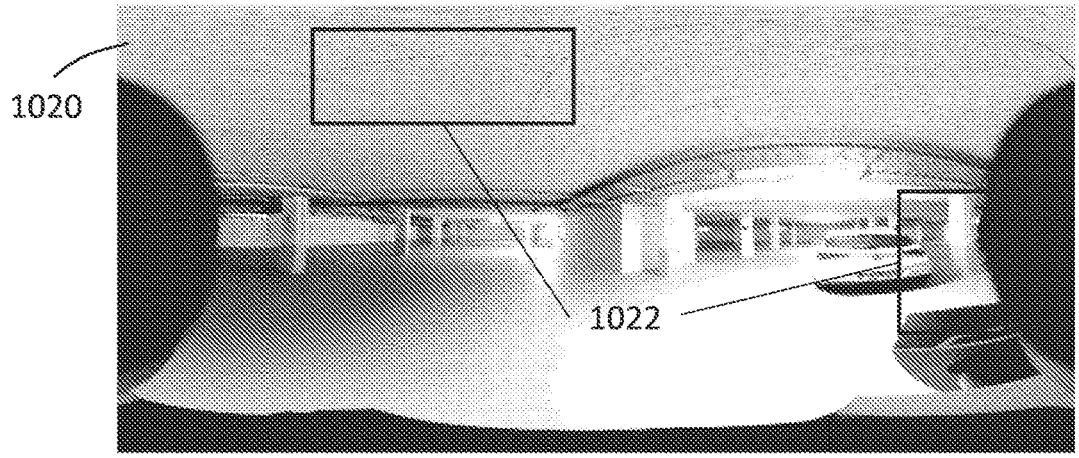

Typically, corresponding regions in the ultrawide-angle image calibration image from the auxiliary image acquisition image 66 and the control images (color or intensity) from the scanner 20 have large local geometrical deformation differences. It is due to different geometrical projection models. FIG. 11 shows a control image 1000 (color image) and the ultrawide-angle image 1010 and for example, two corresponding image regions 1002, 1012 with geometrical difference. These deformation differences limit the performance of feature matching and can result in a limited number of matching features particularly around the rim of ultrawide-angle image 1010.

To address such a technical challenge, i.e., to reduce/eliminate the local deformation difference at corresponding regions, the ultrawide-angle image 1010 is converted to a spherical image 1020. This transformation is based on the ultrawide-angle sensor model, describe herein, and using a mapping between the spherical image 1020 and the ultra-wide-angle image 1010. By this transformation, the differences of local deformation at corresponding regions are minimized (comparing 1000 and 1020). Therefore, as a result the feature descriptors become more similar and more features are matched especially around nadir and zenith of the control image 1010.

In order to establish the mapping function from the ultra-wide-angle image points (x, y) to spherical image pixels (col, row), the space vector of the pixels of the ultra-wide-angle image is computed as follows:

$$s = \begin{pmatrix} x + \Delta x \\ y + \Delta y \\ -\frac{c}{m} \end{pmatrix}$$

in which, x, y, c, and m are defined in equation (1) and $\Delta x$, $\Delta y$ are defined in equation (2). The space vector is then normalized $$\left(s = \frac{s}{\|s\|}\right).$$

"s" is in the 3D Cartesian coordinate system with unit length. By converting the Cartesian coordinate system to Polar coordinate system, ($\theta$, $\varphi$) are computed. $\theta$ is the azimuth angle with a range from [0, 360°]. $\varphi$ is the zenith angle having a range [0, 90°]. The pixel in the spherical image (col,row) is computed by dividing ($\theta$, $\varphi$) to the pitch angle. The pitch angle is computed by dividing the pixel pitch of the external camera to its camera constant.

Further, the method 900 includes matching the features that are extracted across all of the images, at block 910. For a full system calibration (FSC), in which the control panorama image is the stitched images of the built-in camera, a K-nearest neighbor (KNN) similarity search algorithm can be used for feature matching. KNN similarity search algorithm is a non-parametric method used for classification and regression. The process of feature matching is time consuming. Hence, to speed-up the computation approximated nearest neighbor search like the FLANN algorithm can be performed in one or more embodiments. FLANN is a library for performing fast approximate nearest neighbor searches in high dimensional spaces. It should be noted that the feature matching is not limited to a specific algorithm, and that in other embodiments, the feature matching can be performed by executing algorithms that can be run on GPU like those in the libraries like FAISS, etc. For a limited system calibration (LSC), in which the control panorama image is the laser intensity image, a hybrid feature matching is used (which is described in a co-pending application, U.S. patent application Ser. No. 17/678,119).

Figure 12:
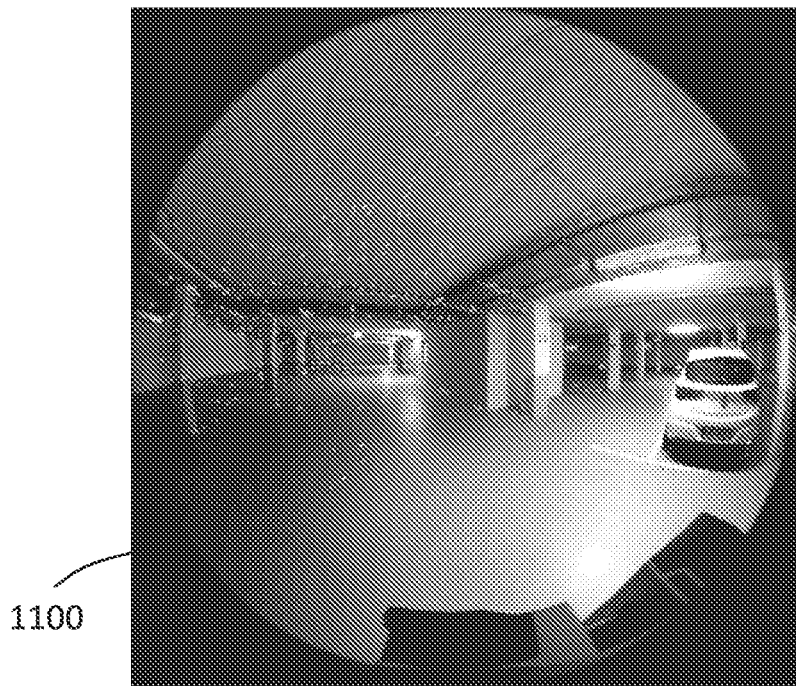
FIG. 12 shows matching features between a control image and a calibration image in an example scenario according to one or more embodiments.
Figure 12:
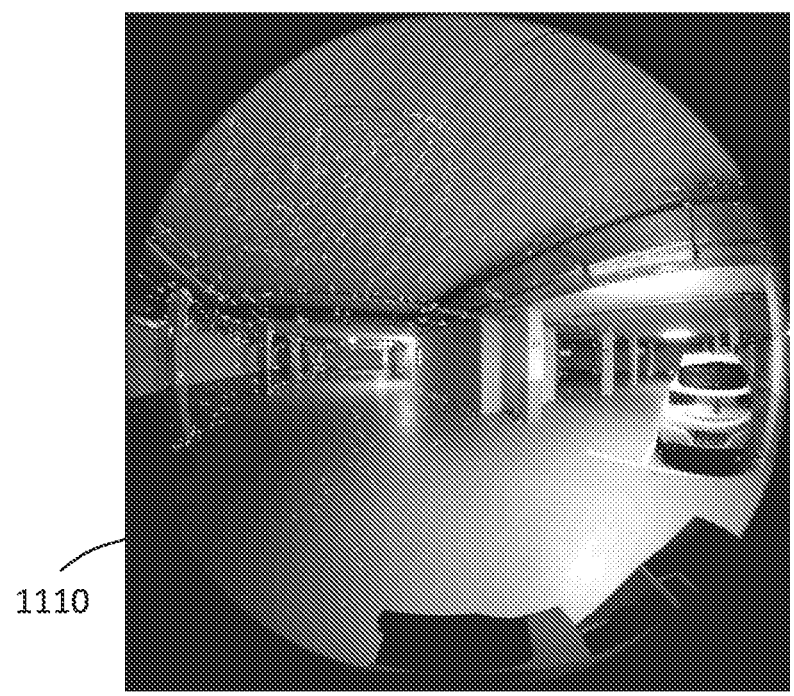

FIG. 12 depicts corresponding features between the color image 1000 and the ultrawide-angle image 1010. The resulting match 1100 is a result of matching features extracted from the ultrawide-angle image 1010 and the control image 1000. In the depicted example, 694 features are matched by using the ultrawide-angle image 1010 and the control image 1000. In the second case, the resulting match 1110 is a result of matching features extracted from the control image 1000 and the spherical image 1020, which is obtained by transforming the ultrawide-angle image 1010 to the spherical image space. Here, the resulting match 1110 includes 1657 matching features. It is understood that the number of features that are extracted and matched can be different in different embodiments based on the extraction technique and the matching technique that is used. It should be noted that the matched features from the spherical image 1020 have been transferred to the ultrawide-angle image 1010 using a reverse transformation from the spherical image space to the ultrawide-angle image space.

At block 912, the 3D coordinates of matched features are estimated using the 3D point cloud. The control image, the calibration image, and the 3D point cloud are captured by the camera 112, the auxiliary image acquisition device 66, and the 3D scanner 20, respectively, from the same position/location in 3D space. Because the extracted features have sub-pixel accuracy, estimating their 3D coordinates requires more than picking a corresponding point to the feature from the point cloud. In an embodiment, a bilinear interpolation is used to estimate the 3D coordinates of the matching features. Bilinear interpolation is an extension of linear interpolation for interpolating functions of two variables (e.g., x and y) on a rectilinear 2D grid. Bilinear interpolation is performed using linear interpolation first in one direction, and then again in the other direction. Although each step is linear in the sampled values and in the position, the interpolation is not linear but rather quadratic in the sample location.

In an example, the control image 1000, which is captured by the internal camera 112 is mapped with the 3D point cloud. The 3D coordinate of the matched feature is estimated by identifying the pixel/sub-pixel where the matched feature maps. As noted earlier, if the matched feature maps to a sub-pixel, the surrounding coordinates are used to perform the bilinear interpolation to determine the 3D coordinate of the matched feature.

It should be noted that other techniques can also be used for estimating the 3D coordinates of the features. For example, other interpolation approaches like bicubic interpolation can be used in other embodiments. The 3D coordinates of the features are stored as the control points.

Referring to the flowchart in FIG. 10, at block 914, system calibration is done on-the-fly by using a numerical approach using "bundle adjustment" with camera self-calibration. Given a set of images depicting a number of 3D points from different viewpoints, "bundle adjustment" can be defined as the problem of simultaneously refining the 3D coordinates describing the scene geometry, the parameters of the relative motion, and the optical characteristics of the camera(s) employed to acquire the images, according to an optimality criterion involving the corresponding image projections of all points. In order to improve the reliability of bundle adjustment, embodiments herein extend the bundle adjustment by using image clusters. Here, the unknowns, i.e., the calibration parameters of the auxiliary image acquisition device 66, are estimated simultaneously for a cluster of images using least squares optimization approach.

An image cluster is defined as a group of images. They have a constant relative orientation among each other. For example, an image cluster can be defined by the left and right images captured by a dual camera 66 (FIG. 5), such as RICOH THETA®. The dual camera includes a left camera 1202, and a right camera 1204. It is understood that the two cameras 1202, 1204, can be labeled using any other labels, such as first camera, and second camera, etc. Each image cluster includes at least one image captured by the left camera 1202, and a corresponding image captured by the right camera 1204. Each image cluster has at least six exterior orientation parameters that according to which the cluster is oriented and positioned in 3D space. These 6 parameters are equivalent to dual camera orientation parameters at 504. Based on the geometry of the dual camera 66, at least three conditions can be imposed to the relative position of the dual camera 66:

$\Delta X=0$, the two cameras (left and right) are at the same X-coordinate position; $\Delta Y=0$, the two cameras (left and right) are at the same Y-coordinate position; and $\Delta Z=z$ mm, the two cameras (left and right) have a spacing distance equal to z mm. Here, the above values can be configured according to the geometry of the auxiliary image acquisition device 66. For example, z=15 mm, 19 mm, 27 mm, etc.; x=0, 5 mm, 10 mm, etc.; and y=0, 5 mm, 10 mm, etc.

Based on the conditions, the bundle adjustment is modified in embodiments herein, so that the relative orientation parameters of the images of a cluster and the exterior orientation parameters of the image clusters are estimated simultaneously together with camera calibration parameters. The exterior orientation parameters of the image clusters are equivalent to multi-device orientation parameters at 506. If relative orientation of the images of a cluster are known in advance, they can be used as constraints or conditions.

In one or more embodiments, the calibration and the configuration of the system calibration parameters 500 is performed using the measurement device 100 in the field. This improves the efficiency of the usage of measurement device 100. Without the features described herein, the measurement device 100, with the auxiliary image acquisition device 66, had to be pre-calibrated in a controlled environment.

In one or more embodiments, once the system is calibrated using method 900, the measurement device 100 can be calibrated to determine one or more correction factors based on the sensor model of the auxiliary image acquisition device 66. The correction factors are subsequently applied to each of the 2D coordinates of the images acquired by the auxiliary image acquisition device 66.

The corrected coordinates of the image together with exterior orientation of images of the external camera 66 are used during the colorization of the 3D point cloud in the method 200 (block 210). Accordingly, the 3D image generated by the measurement device 100 is colorized more accurately by embodiments described herein compared to existing solutions.

Figure 13:
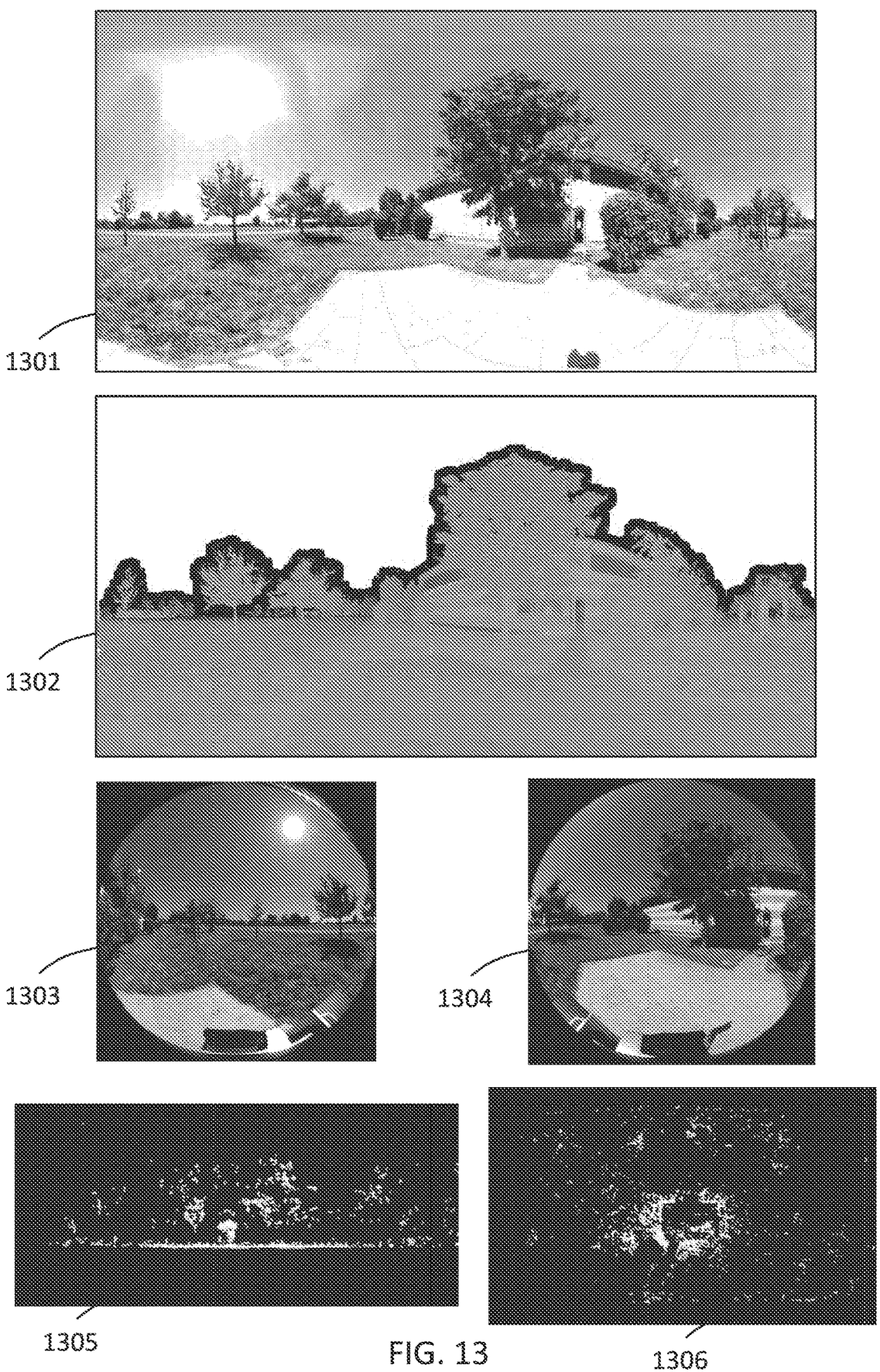
FIG. 13 depicts an example result in an example scenario according to one or more embodiments.

FIG. 13 depicts an example result from embodiments described herein. In an outdoor setting control images 1301, 1302 are captured as laser panoramas. A color image 1301 is computed by stitching the images taken from the built-in camera 112 of the laser scanner 20. Further, a laser intensity image 1302 can be measured directly by the laser scanner 20. Further shown are calibration images 1303, 1304 taken by the auxiliary image acquisition device 66, in this case, a left image 1303, and a right image 1304 captured by a dual camera (FIG. 5). The constructed control points based on these images are shown in a side view 1305, and a top view 1306. All system calibration parameters at 500 including the camera calibration parameters 502, the dual camera orientation parameters 504, and the multi-device orientation parameters 506 were estimated successfully by using the control points and the bundle adjustment by using image clusters, as described herein. It should be noted that although an outdoor setting is shown in the example results in FIG. 13, embodiments herein address the technical challenges described herein in indoor settings as well.

Embodiments described herein facilitate system calibration, which works based on space resection using a test-field of control points. Embodiments described herein facilitate the test-field of control points to established dynamically, at the worksite (field). Further, to address technical challenges, embodiments herein also modify feature extraction to increase number of control points that can be extracted, and consequently that can be matched between control images and calibration images. Further, bundle adjustment is modified by using image clusters in order to handle additional constraints/conditions that are to be imposed because of a dual camera with ultrawide-angle lenses.

As a result, embodiments described herein address the technical problem of system calibration reliably, even in scenarios that typically have a low number of control points, and inhomogeneous distribution of control points in 360° field of view provided by an ultrawide-angle lens. Accordingly, using embodiments described herein, with typically one image from each camera (1202, 1204) in a dual camera (1200), the system calibration parameters can be estimated reliably and accurately.

The accuracy of control points resulting from embodiments described herein is limited only by the accuracy of stitching the images of the internal camera 112 of the laser scanner 20 to generate a control image 1000. The reliability of embodiments described herein depends on the feature distribution and the number of features that can be extracted in 360° field of view of the ultrawide-angle lenses. The results from several example studies (e.g., FIG. 13) have shown that the number of features and the distribution facilitate a reliable and accurate camera calibration using embodiments described herein.

Figure 14:
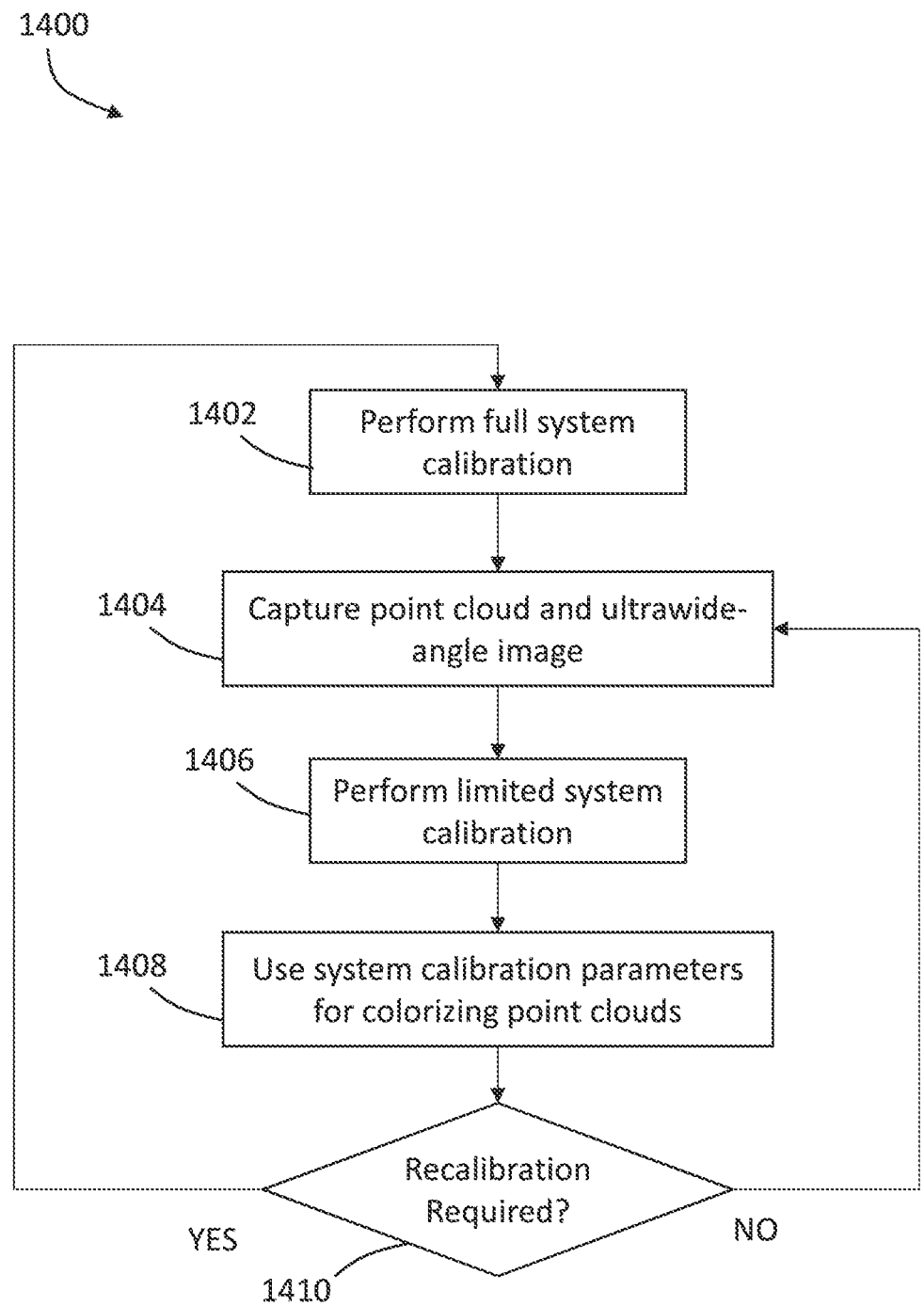
FIG. 14 depicts a flowchart of a method for using data captured by a measurement device using on-the-fly calibration according to one or more embodiments.
Figure 15:
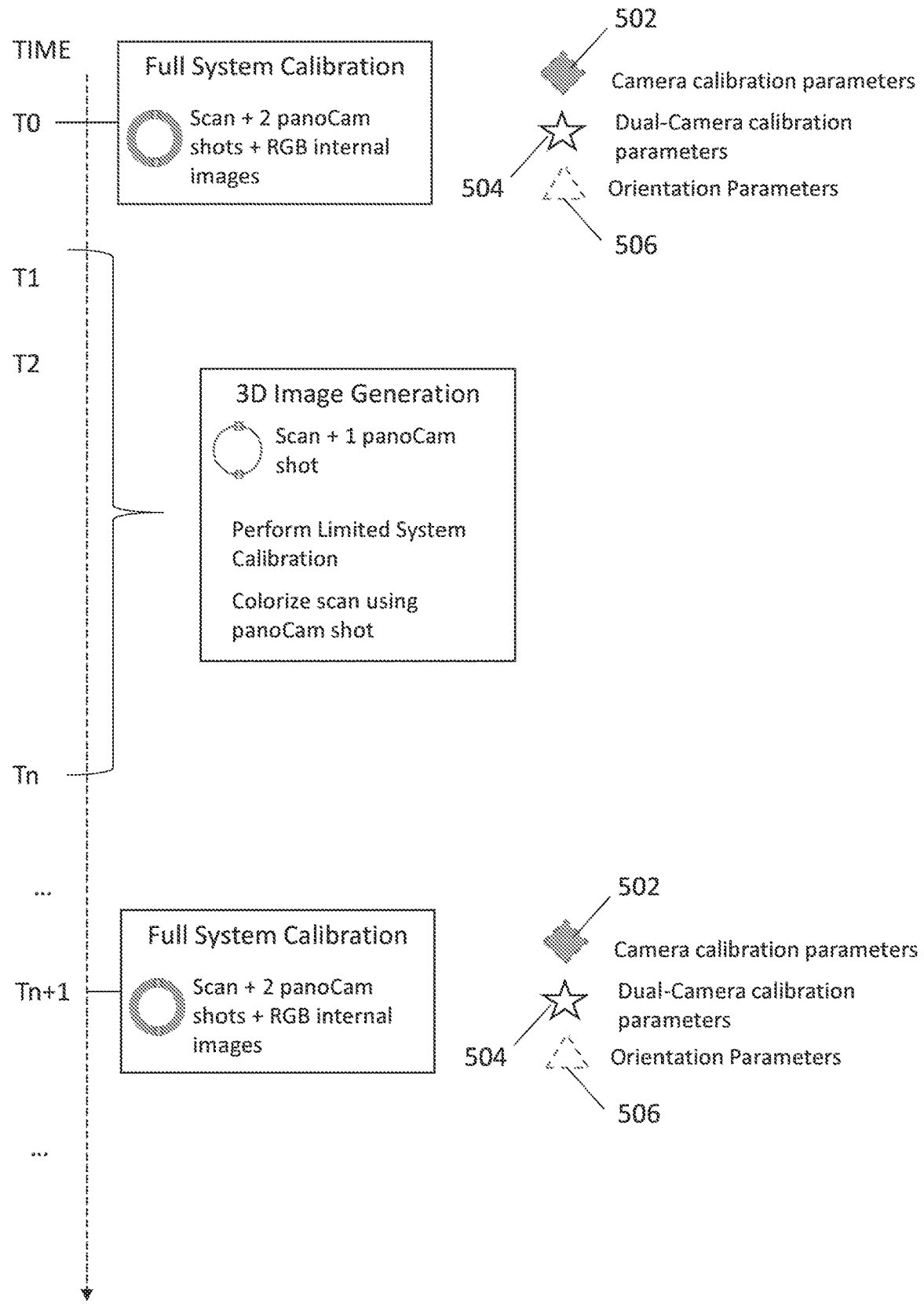
FIG. 15 provides a visual depiction of an example timeline of a workflow for performing the method of FIG. 14.

FIG. 14 depicts a flowchart of a method for using data captured by a measurement device using on-the-fly system calibration according to one or more embodiments. FIG. 15 provides a visual depiction of an example timeline of a workflow for performing the method 1400.

The method 1400 includes performing FSC of the measurement device 100, at block 1402. The FSC is performed at a predetermined frequency, such as every month, 2 or 4 months, etc. Typically, the FSC will be performed before the very first use of the measurement device 100. In the workflow of FIG. 15, at timepoint T0, an FSC is performed to determine all the system calibration parameters 500.

As noted earlier, FSC determines all the system calibration parameters 500, and accordingly, can take longer than performing LSC. The reasons FSC takes longer includes that it requires more data to be captured. The FSC requires a laser scan, at least two panoramic images from the camera 66, and a control image (multiple images) from the internal camera 112. Using this captured data, all the system calibration parameters 500 are computed as described herein.

Further, to generate the 3D image of the environment using the calibrated measurement device, the scanner 20 captures the point cloud(s) and the camera 66 captures the corresponding ultrawide-angle image, at bock 1404. The computer 150 receives the captured data and performs an LSC, at 1406. As noted earlier, LSC only computes a partial set of the system calibration parameters 500, using only the 3D scan and the ultrawide-angle image. The LSC updates the partial set of the system calibration parameters 500, if the computation is successful.

The updated system calibration parameters 500 are used for colorizing the captured point cloud from the scanner 20 using the ultrawide-angle image from the camera 66 using the mapping formulae described herein. (see equation (1)), at block 1408.

At block 1410, it is determined whether a full system recalibration is required. For example, after the predetermined duration, and/or after the predetermined number of uses of the measurement device 100, the system calibration changes. Alternatively, the system calibration can change because of user errors, accidental changes, or any other such reasons.

Referring to the example scenario in FIG. 15, at timepoint T1 it is determined that a FSC is not required. Accordingly, the 3D image generation is performed, where an LSC is performed and the updated system calibration parameters 500 from the LSC are used to colorize the captured point cloud. Timepoints T1-Tn are performed in the similar manner. For example, T1-Tn can represent the predetermined duration, the predetermined number of iterations, or iterations until the colorization does not result in a distortion beyond a predetermined threshold. At timepoint Tn+1, a full system recalibration is deemed to be required, and another FSC is performed for the measurement device 100. The FSC determines a new set of system calibration parameters 500. The above steps can be performed continuously over time.

Figure 16:
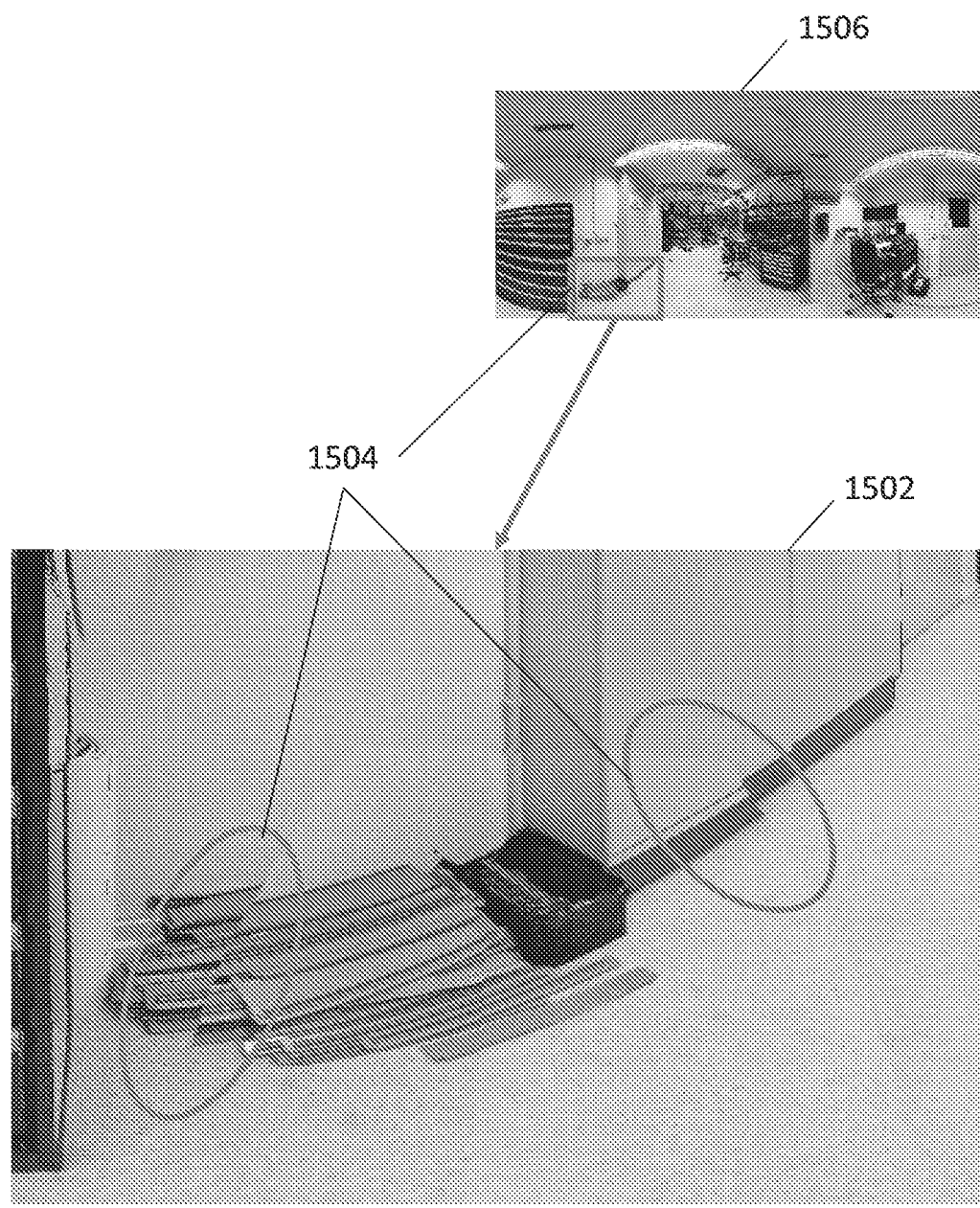
FIG. 16 depicts an example scenario with 3D point cloud being colorized without a limited system calibration according to one or more embodiments.

FIG. 16 depicts an example scenario where a portion 1504 of the point cloud 1502 colorized using an ultrawide-angle image 1506 from camera 66 results in a distorted view. In this particular example scenario, the coloring is performed using the system calibration parameters 500 computed by an FSC that was performed 3 weeks earlier. In this case, the alignment errors in the portion 1504 are seen because of change of the system calibration parameters 500 (aging effect). In other embodiments, the system calibration parameters can change because of other reasons, and the alignment errors can be different than those depicted in FIG. 16.

Figure 17:
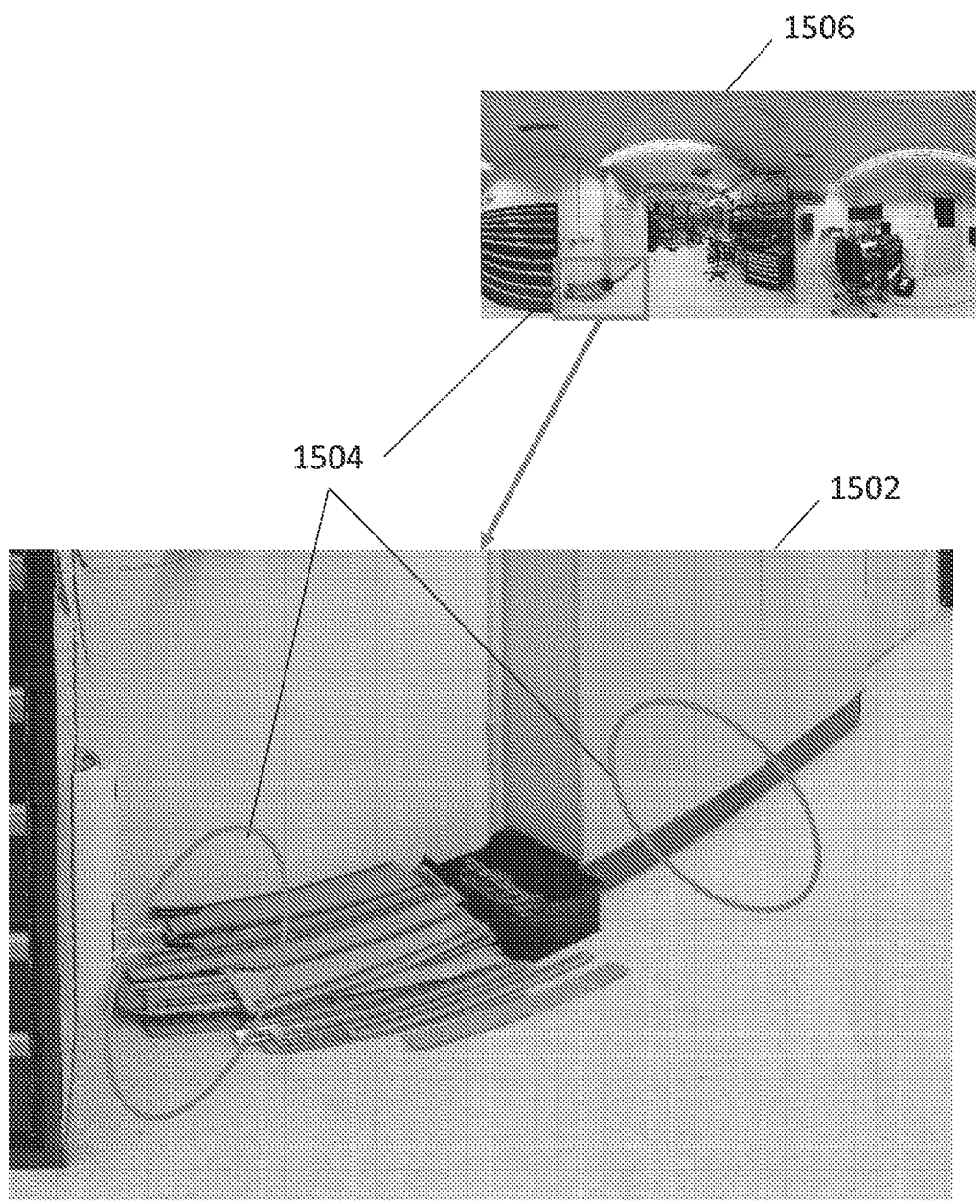
FIG. 17 depicts an example scenario with 3D point cloud being colorized with a limited system calibration according to one or more embodiments.

Technical solutions described herein, by using the LSC before each colorization, avoids such distortion. FIG. 17 depicts a result of colorization of the same example scene of FIG. 16 using the technical solutions described herein. As can be seen the distortions (from FIG. 16) in the portions 1504 are not visible in the case of FIG. 17.

Embodiments described herein, accordingly provide a practical application to improve operation of a 3D measurement device, particularly a 3D scanner that uses an auxiliary image acquisition device equipped with an ultrawide-angle lens. Embodiments described herein facilitate the on-the-fly system calibration using control points that are generated dynamically, at runtime, on the worksite, without requiring expensive and time-consuming steps of setting up a control environment. Such camera calibration is the pre-requisite of all 3D measurement applications.

The technical solutions described herein creates significant timesaving and flexibility for the user. The technical solutions provide an improvement to computing technology of 3D measurement devices, and particularly colorizing point clouds captured by a 3D scanner using an ultrawide-angle image. The improvements include requiring lesser data collection compared to performing an FSC at a higher frequency. The technical solutions described herein provide a practical application and does not require additional data for the improvement, because an LSC uses the same data that is captured for generating the colorized point cloud (with or without an LSC).

Apart from the system calibration process, embodiments described herein can be used within the process of coloring a point cloud that is captured by the scanner 20, at least in the following modes: static scanning, and dynamic scanning (e.g., FARO® SWIFT®).

It should be appreciated that while embodiments herein describe the reduction of the image point residuals with reference to the use of the camera with the ultrawide-angle lens and a three-dimensional scanner, this is for example purposes and the claims should not be so limited. In other embodiments, the residual reduction could be used in other applications that use an omnidirectional camera, or a camera with a single ultrawide-angle lens to improve the accuracy of the image.

Terms such as processor, controller, computer, DSP, FPGA are understood in this document to mean a computing device that may be located within an instrument, distributed in multiple elements throughout an instrument, or placed external to an instrument.

While embodiments of the invention have been described in detail in connection with only a limited number of embodiments, it should be readily understood that embodiments of the invention are not limited to such disclosed embodiments. Rather, embodiments of the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, embodiments of the invention are not to be seen as limited by the foregoing description, but is only limited by the scope of the appended claims.

What is claimed is:

1. A system comprising:
a three-dimensional (3D) scanner that captures a 3D point cloud that comprises a plurality of 3D coordinates corresponding to one or more objects scanned in a surrounding environment;
a camera that captures a control image by capturing a plurality of images of the surrounding environment, wherein images from the plurality of images are stitched to form the control image;
an auxiliary camera configured to capture an ultrawide-angle image of the surrounding environment; and
one or more processors configured to:
colorize the 3D point cloud using the ultrawide-angle image by mapping the ultrawide-angle image to the 3D point cloud;
perform a full system calibration to calibrate the 3D scanner, the camera, and the auxiliary camera using the 3D point cloud, the control image, and a calibration image, which is another ultrawide-angle image from the auxiliary camera,
wherein performing the full system calibration comprises:
extracting a first plurality of features from the control image using a feature-extraction algorithm;
extracting a second plurality of features from the calibration image using the feature-extraction algorithm;
determining a set of matching features from the first plurality of features and the second plurality of features by using a feature-matching algorithm;
building a control point test-field by using the set of matching features and the 3D point cloud; and
determining a set of system calibration parameters on-the-fly using bundle adjustment and camera self-calibration; and
perform a limited system calibration before colorizing the 3D point cloud, wherein the limited system calibration comprises updating a subset of system calibration parameters from the set of system calibration parameters.

2. The system of claim 1, wherein the limited system calibration comprises:
extracting a third plurality of features from the control image using the feature-extraction algorithm;
determining another set of matching features to the extracted features at the first plurality of features by using a hybrid feature matching algorithm;
building another control point test-field by using the another set of matching features and the 3D point cloud; and
determining updated values for at least one of the system calibration parameters.

3. The system of claim 2, wherein the another set of matching features is determined based at least in part from the set of matching features.

4. The system of claim 1, wherein extracting the second plurality of features from the calibration image comprises:
transforming the calibration image to a spherical image; and
extracting the second plurality of features from the spherical image.

5. The system of claim 1, wherein the full system calibration is performed after the 3D point cloud is colorized.

6. The system of claim 1, wherein the auxiliary camera includes two lenses at predetermined offsets relative to each other.

7. The system of claim 1, wherein the set of system calibration parameters includes a first plurality of camera calibration parameters, a second plurality of dual-camera calibration parameters, and a third plurality of multi-device orientation parameters.

8. The system of claim 1, wherein the auxiliary camera is mounted on the 3D scanner at a predetermined position relative to the 3D scanner.

9. The system of claim 1, wherein the control point test-field is dynamically built by selecting a subset of points of the set of matching features and the 3D point cloud.

10. The system of claim 1, wherein each of the parameters of the set of system calibration parameters is determined simultaneously.

11. The system of claim 1, wherein each of the parameters of the set of system calibration parameters is determined from a set of images captured by the 3D scanner, the camera, or the auxiliary camera.

12. The system of claim 11, wherein the set of images comprises the plurality of 3D coordinates corresponding to one or more objects scanned in a surrounding environment, the plurality of images of the surrounding environment, and the ultrawide-angle image of the surrounding environment.

13. A method comprising:
periodically performing a full system calibration of a measurement device that comprises a 3D scanner, a camera, and an auxiliary camera, wherein the full system calibration is performed using a first 3D point cloud, a control image, and a calibration image,
wherein performing the full system calibration comprises:
extracting a first plurality of features from the control image using a feature-extraction algorithm, wherein the control image is captured by the camera by capturing and stitching a plurality of images;
extracting a second plurality of features from the calibration image using the feature-extraction algorithm, the calibration image being an ultrawide-angle image from the auxiliary camera;
determining a set of matching features from the first plurality of features and the second plurality of features by using a feature-matching algorithm;
building a control point test-field by using the set of matching features and the first 3D point cloud; and
determining a set of system calibration parameters on-the-fly using bundle adjustment and camera self-calibration; and
performing a limited system calibration of the measurement device in response to capturing a second 3D point cloud that is to be colorized, wherein the limited system calibration comprises updating a subset of system calibration parameters from the set of system calibration parameters using the second 3D point cloud and a second ultrawide-angle image from the auxiliary camera.

14. The method of claim 13, wherein the limited system calibration comprises:
- extracting a third plurality of features from the control image using the feature-extraction algorithm;
- determining another set of matching features to the extracted features at the first plurality of features by using a hybrid feature matching algorithm;
- building another control point test-field by using the another set of matching features and the second 3D point cloud; and
- determining updated values for at least one of the system calibration parameters.

15. The method of claim 13, wherein extracting the second plurality of features from the calibration image comprises:
- transforming the ultrawide-angle image to a spherical image; and
- extracting the second plurality of features from the spherical image.

16. The method of claim 13, wherein two successive full system calibrations are performed after a predetermined interval.

17. The method of claim 13, wherein the auxiliary camera includes two lenses at predetermined offsets relative to each other.

18. The method of claim 13, wherein successive full system calibrations are performed after a predetermined number of 3D point clouds are colorized.

19. A computer program product comprising one or more memory devices with computer executable instructions stored thereon, the computer executable instructions when executed by one or more processors cause the one or more processors to perform a method comprising:
- periodically performing a full system calibration of a measurement device that comprises a 3D scanner, a camera, and an auxiliary camera, wherein the full system calibration is performed using a first 3D point cloud, a control image, and a calibration image, wherein performing the full system calibration comprises:
  - extracting a first plurality of features from the control image using a feature-extraction algorithm, wherein the control image is captured by the camera by capturing and stitching a plurality of images;
  - extracting a second plurality of features from the calibration image using the feature-extraction algorithm, the calibration image being an ultrawide-angle image from the auxiliary camera;
  - determining a set of matching features from the first plurality of features and the second plurality of features by using a feature-matching algorithm;
  - building a control point test-field by using the set of matching features and the first 3D point cloud; and
  - determining a set of system calibration parameters on-the-fly using bundle adjustment and camera self-calibration; and
- performing a limited system calibration of the measurement device in response to capturing a second 3D point cloud that is to be colorized, wherein the limited system calibration comprises updating a subset of system calibration parameters from the set of system calibration parameters using the second 3D point cloud and a second ultrawide-angle image from the auxiliary camera.

20. The computer program product of claim 19, wherein the limited system calibration comprises:
- extracting a third plurality of features from the control image using the feature-extraction algorithm;
- determining another set of matching features to the extracted features at the first plurality of features by using a hybrid feature matching algorithm;
- building another control point test-field by using the another set of matching features and the second 3D point cloud; and
- determining updated values for at least one of the system calibration parameters.

* * * * *